(12) United States Patent
Hommi

(10) Patent No.: US 7,451,847 B2
(45) Date of Patent: Nov. 18, 2008

(54) VEHICLE CONTROL METHOD

(75) Inventor: Akira Hommi, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 110 days.

(21) Appl. No.: 10/565,644

(22) PCT Filed: Jul. 26, 2004

(86) PCT No.: PCT/JP2004/011004

§ 371 (c)(1),
(2), (4) Date: Jan. 24, 2006

(87) PCT Pub. No.: WO2005/012025

PCT Pub. Date: Feb. 10, 2005

(65) Prior Publication Data
US 2006/0185914 A1 Aug. 24, 2006

(30) Foreign Application Priority Data
Jul. 30, 2003 (JP) ............................ 2003-203736

(51) Int. Cl.
*B60K 28/16* (2006.01)
(52) U.S. Cl. ...................... 180/197; 180/165
(58) Field of Classification Search ................ 180/197, 180/235, 244, 248, 65.2, 65.1, 65.3, 165; 701/83, 41; 188/181 A, 181 R, 151 A, 156
See application file for complete search history.

(56) References Cited

U.S. PATENT DOCUMENTS

| | | | | |
|---|---|---|---|---|
| 3,622,973 A * | 11/1971 | Domann et al. | ......... | 188/181 A |
| 3,659,263 A * | 4/1972 | Gunsser et al. | ............. | 180/197 |
| 4,335,337 A * | 6/1982 | Okamatsu et al. | ............. | 318/52 |
| 4,521,856 A * | 6/1985 | Phelps et al. | ................ | 180/197 |
| 4,871,043 A * | 10/1989 | Fujii et al. | .................. | 180/248 |
| 4,989,686 A * | 2/1991 | Miller et al. | ................ | 180/197 |
| 4,991,679 A * | 2/1991 | Fujii et al. | .................. | 180/244 |
| 5,041,772 A * | 8/1991 | Earleson et al. | ............. | 318/375 |
| 5,103,925 A * | 4/1992 | Imaseki et al. | ................ | 701/41 |
| 5,199,325 A * | 4/1993 | Reuter et al. | ................. | 180/248 |
| 5,213,177 A * | 5/1993 | May | ........................... | 180/197 |
| 5,318,355 A * | 6/1994 | Asanuma et al. | ............ | 180/165 |
| 5,343,970 A * | 9/1994 | Severinsky | ................. | 180/65.2 |
| 5,455,771 A | 10/1995 | Fujioka | | |

(Continued)

FOREIGN PATENT DOCUMENTS

DE 3724574 A1 2/1988

(Continued)

*Primary Examiner*—Hau V Phan
(74) *Attorney, Agent, or Firm*—Kenyon & Kenyon LLP

(57) ABSTRACT

In response to detection of a slip occurring on left and right front wheels (62a, 62b) caused by spin of one of the left and right front wheels (62a, 62b), the control technique of the invention restricts a torque output from a motor (22) to a drive shaft (28), while activating a hydraulic brake (54a) or (54b) corresponding to the spinning wheel to output a brake torque, so as to distribute the output torque of the motor (22) practically equally into the left and right front wheels (62a, 62b). This arrangement desirably improves the starting performance and the accelerating performance of a vehicle with the left and right front wheels (62a, 62b) running on the road surface of different frictional coefficients.

20 Claims, 18 Drawing Sheets

U.S. PATENT DOCUMENTS

| | | | |
|---|---|---|---|
| 5,476,310 A * | 12/1995 | Ohtsu et al. | 180/165 |
| 5,535,124 A * | 7/1996 | Hosseini et al. | 701/83 |
| 5,731,975 A | 3/1998 | Nakashima | |
| 6,473,683 B1 | 10/2002 | Nada | |
| 2001/0032046 A1 | 10/2001 | Nada | |
| 2001/0054520 A1 | 12/2001 | Hosomi et al. | |
| 2002/0084127 A1 | 7/2002 | Kohler et al. | |

FOREIGN PATENT DOCUMENTS

| | | |
|---|---|---|
| DE | 195 28 553 A1 | 2/1996 |
| DE | 199 49 220 A1 | 4/2001 |
| DE | 101 14 273 A1 | 10/2002 |
| EP | 0 265 969 A2 | 5/1988 |
| EP | 1 270 352 A1 | 1/2003 |
| JP | 01-249557 | 10/1989 |
| JP | 05-91955 | 12/1993 |
| JP | 07-251654 | 10/1995 |
| JP | 08-183438 | 7/1996 |
| JP | 11-348757 | 12/1999 |
| JP | 2001-295676 | 10/2001 |
| JP | 2003-104186 | 4/2003 |
| WO | WO 96/11826 | 4/1996 |

* cited by examiner

VEHICLE CONTROL METHOD

This is a 371 national phase application of PCT/JP2004/011004 filed Jul. 26, 2004, claiming priority to Japanese Patent Application No. 2003-203736 filed Jul. 30, 2003, the contents of which are incorporated herein by reference.

TECHNICAL FIELD

The present invention relates to a vehicle and a control method of the vehicle. More specifically the invention pertains to a vehicle equipped with a power output device that is capable of outputting a driving force to a drive shaft linked with left and right wheels, as well as to a control method of a vehicle equipped with a power output device that is capable of outputting a driving force to a drive shaft linked with left and right wheels and with a mechanical braking device that is capable of outputting a mechanical braking force to each of the left and right wheels.

BACKGROUND ART

A proposed vehicle restricts torque output to a drive shaft linked with drive wheels, in response to detection of a slip caused by spin of a drive wheel (see, for example, Japanese Patent Laid-Open Gazette No. 2001-295676). When an angular acceleration of the drive shaft exceeds a predetermined threshold value, this prior art vehicle detects the occurrence of a slip on the drive wheels and restricts the torque output from a motor connecting with the drive shaft.

In the event of spin of one of the left and right drive wheels during a run (especially a start) of the vehicle with the left and right wheels on the road surface of different frictional coefficients, the motor torque is unevenly output to only the spinning wheel. This lowers the driving force to drive the vehicle and may thus deteriorate the starting performance and the accelerating performance of the vehicle.

DISCLOSURE OF THE INVENTION

The vehicle and the control method of the vehicle of the invention accordingly aim to improve the starting performance and the accelerating performance of the vehicle with left and right wheels running on the road surface of different frictional coefficients.

In order to attain at least part of the above and the other related objects, the invention is directed to a vehicle and a control method of the vehicle as discussed below.

A vehicle of the invention is equipped with a power output device that is capable of outputting a driving force to a drive shaft linked with left and right wheels, and includes: a mechanical braking device that is capable of outputting a mechanical braking force to each of the left and right wheels; a slip detection module that detects a slip on each of the left and right wheels caused by wheelspin; and a controller that, in response to detection of a slip caused by spin of one of the left and right wheels by the slip detection module, drives and controls the power output device to restrict the driving force output to the drive shaft, while actuating and controlling the mechanical braking device to output a mechanical braking force to the spinning one of the left and right wheels.

In response to detection of a slip due to spin of one of the left and right wheels by the slip detection module that detects a slip on each of the left and right wheels caused by wheelspin, the vehicle of the invention drives and controls the power output device to restrict the driving force output to the drive shaft linked with the left and right wheels, while actuating and controlling the mechanical braking device to output the mechanical braking force to the spinning one of the left and right wheels. The restriction of the driving force output from the power output device effectively eliminates the slip. The output of the braking force from the mechanical braking device to the spinning one of the left and right wheels effectively prevents the driving force of the power output device from being unevenly output to only the spinning one of the left and right wheels. This arrangement desirably improves the starting-performance and the accelerating performance of the vehicle with the left and right wheels running on the road surface of different frictional coefficients.

In the vehicle of the invention, the controller may actuate and control the mechanical braking device to output a braking force to the spinning one of the left and right wheels, so as to distribute the driving force output from the power output device to the drive shaft practically equally into the left and right wheels. This arrangement further enhances the starting performance and the accelerating performance of the vehicle.

The vehicle of the invention may further include a road surface gradient measurement estimation module that either measures or estimates a road surface gradient, and the controller may actuate and control the mechanical braking device, in response to detection of at least a converging tendency with regard to the spin of one of the left and right wheels, to output the braking force to the spinning one of the left and right wheels, based on the measured or estimated road surface gradient. This arrangement further enhances the starting performance and the accelerating performance of the vehicle with the left and right wheels running on the road surface of different frictional coefficients, regardless of the road surface gradient. In this case, the road surface gradient measurement estimation module may estimate a balancing force, which balances with a force applied to the vehicle in a direction along a road surface based on an acceleration of the vehicle and the driving force output from the power output device, as the road surface gradient, and the controller may calculate a supplementary braking force corresponding to an insufficiency of the driving force output from the power output device to the drive shaft relative to the estimated balancing force, and actuate and control the mechanical braking device to output a total braking force including the calculated supplementary braking force to the spinning one of the left and right wheels. The output of the braking force to the spinning one of the left and right wheels enables the driving force of the power output device to be output to a non-spinning wheel as a driving force required for running on the road surface with a slope.

Moreover, the vehicle of the invention may include an upper limit braking force setting module that sets an upper limit of the braking force output to the spinning one of the left and right wheels, and the controller may actuate and control the mechanical braking device to output the braking force in a range of the setting of the upper limit to the spinning one of the left and right wheels. This arrangement effectively prevents deterioration of the stability and the accelerating performance of the vehicle by application of an excess braking force. In this case, the vehicle may include a vehicle speed sensor that measures a vehicle speed, and the upper limit braking force setting module may set the upper limit of the braking force, based on the measured vehicle speed. Further, the vehicle may include a road surface gradient measurement estimation module that either measures or estimates a road surface gradient, and the upper limit braking force setting module may set the upper limit of the braking force, based on the measured or estimated road surface gradient.

In the vehicle of the invention, the controller may actuate and control the mechanical braking device to output the mechanical braking force to the spinning one of the left and right wheels, subject to fulfillment of a predetermined execution condition. The predetermined execution condition may be a non-interference condition that does not interfere with standard control of the mechanical braking device. Such setting desirably prevents interference with the standard control. In this case, the predetermined execution condition may include at least one of a gearshift position in a forward drivable range, an accelerator-on state, a driving force demand of not less than a preset level required to the drive shaft, and a brake-off state. The controller may terminate the output of the braking force to the spinning one of the left and right wheels, when the predetermined execution condition fails to be fulfilled in the course of the output of the braking force to the spinning one of the left and right wheels.

In the vehicle of the invention may further include a vehicle speed sensor that measures a vehicle speed, and the controller may terminate the output of the braking force to the spinning one of the left and right wheels, when the measured vehicle speed exceeds a threshold value in the course of the output of the braking force to the spinning one of the left and right wheels. In this case, the vehicle may further include a road surface gradient measurement estimation module that either measures or estimates a road surface gradient, and the threshold value may be set according to the measured or estimated road surface gradient. Further, the threshold value may be set to decrease with an increase in road surface gradient as an ascending slope.

In the vehicle of the invention, the controller may terminate the output of the braking force to the spinning one of the left and right wheels, in response to detection of a slip caused by spin of the other wheel of the left and right wheels by the slip detection module in the course of the output of the braking force to the spinning one of the left and right wheels. This arrangement desirably prevents output of an excess driving torque and thereby generation of an excess current in a motor due to a slip from a high torque level.

The vehicle of the invention may include a temperature rise detection estimation module that either detects or estimates a predetermined temperature rise in the mechanical braking device, and the controller may terminate the output of the braking force to the spinning one of the left and right wheels, in response to either detection or estimation of the predetermined temperature rise in the mechanical braking device in the course of the output of the braking force to the spinning one of the left and right wheels. This arrangement effectively prevents overheat of the mechanical braking device. In this case, the temperature rise detection estimation module may estimate the predetermined temperature rise in the mechanical braking device, when the output of the braking force to the spinning one of the left and right wheels continues for a predetermined first time. This arrangement ensures simple estimation of the temperature rise in the mechanical braking device. Further, the controller may prohibit output of a braking force in response to spin of one of the left and right wheels over a predetermined second time, after the termination of the output of the braking force. This arrangement easily cools down the mechanical braking device.

The vehicle of the invention may further include a lock detection module that detects a lock of each of the left and right wheels, and the controller terminates the output of the braking force to the spinning one of the left and right wheels, in response to detection of a lock of the spinning one of the left and right wheels by the lock detection module in the course of the output of the braking force to the spinning one of the left and right wheels. This arrangement prevents the vehicle from falling into an unstable attitude.

Moreover, the vehicle of the invention may further include: a revolution speed measurement sensor that respectively measures revolution speeds of the left and right wheels; and a rudder angle measurement estimation module that either measures or estimates a rudder angle, and the slip detection module may detect a slip on each of the left and right wheels, based on the measured revolution speeds of the left and right wheels and the measured or estimated rudder angle. This arrangement ensures accurate detection of a slip on each of the left and right wheels.

In the vehicle of the invention, the slip detection module may detect a slip caused by spin of a drive wheel, based on at least one of an angular acceleration of the drive shaft and a difference between revolution speeds of drive wheels as the left and right wheels linked with the drive shaft and revolution speeds of driven wheels with no output of driving force, and the controller may drive and control the power output device to restrict the driving force output to the drive shaft, in response to detection of a slip caused by the spin of the drive wheel.

A method of the invention is a control method of a vehicle, which is equipped with a power output device that is capable of outputting a driving force to a drive shaft linked with left and right wheels and with a mechanical braking device that is capable of outputting a mechanical braking force to each of the left and right wheels, and includes the steps of: (a) detecting a slip on each of the left and right wheels caused by wheelspin; and (b) in response to detection of a slip caused by spin of one of the left and right wheels in the step (a), driving and controlling the power output device to restrict the driving force output to the drive shaft, while actuating and controlling the mechanical braking device to output a mechanical braking force to the spinning one of the left and right wheels.

In response to detection of a slip caused by spin of one of the left and right wheels, the control method of the vehicle of the invention drives and controls the power output device to restrict the driving force output to the drive shaft linked with the left and right wheels, while actuating and controlling the mechanical braking device to output the mechanical braking force to the spinning one of the left and right wheels. The restriction of the driving force output from the power output device effectively eliminates the slip. The output of the braking force from the mechanical braking device to the spinning one of the left and right wheels effectively prevents the driving force of the power output device from being unevenly output to only the spinning one of the left and right wheels. This arrangement desirably improves the starting performance and the accelerating performance of the vehicle with the left and right wheels running on the road surface of different frictional coefficients.

BEST MODES FOR CARRYING OUT THE INVENTION

Figure 1:
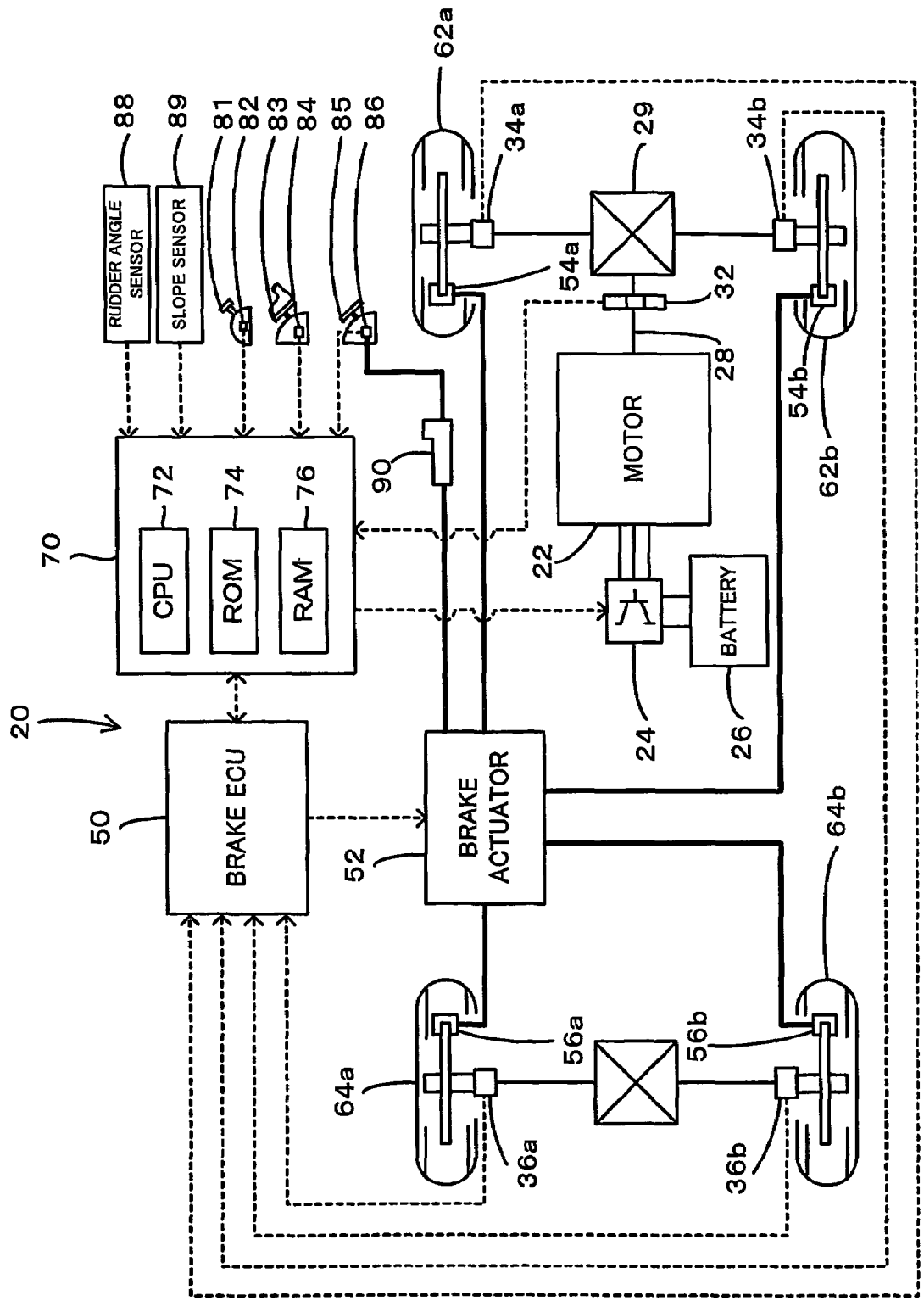
FIG. 1 schematically illustrates the configuration of a vehicle 20 in one embodiment of the invention.

One mode of carrying out the invention is discussed below as a preferred embodiment. FIG. 1 schematically illustrates the configuration of a vehicle 20 in one embodiment of the invention. As illustrated, the vehicle 20 of the embodiment includes a motor 22 that utilizes a supply of electric power from a battery 26 via an inverter circuit 24 and outputs power to a drive shaft 28, which is mechanically linked with drive wheels 62a and 62b via a differential gear 29, and a main electronic control unit 70 that controls the whole vehicle.

The motor 22 is a synchronous motor generator functioning as both a motor and a generator. The inverter circuit 24 includes multiple switching elements to convert an input of electric power from the battery 26 into an adequate form of electric power for driving the motor 22 and output the converted electric power.

Hydraulic brakes 54a, 54b, 56a, and 56b, which are actuated by means of hydraulic pressure from a brake master cylinder 90, are attached to the left and right front wheels 62a and 62b and left and right rear wheels 64a and 64b. Activation and control of a brake actuator 52 (for example, a linear solenoid valve) by a brake electronic control unit (hereafter referred to as brake ECU) 50 regulates the braking torques on the respective wheels. The brake ECU 50 is constructed as a microprocessor including a CPU, a ROM that stores processing programs, a RAM that temporarily stores data, input and output ports, and a communication port, although not being specifically illustrated. The brake ECU 50 receives, via its input port, input signals from various sensors, for example, a left front wheel speed Vfl and a right front wheel speed Vfr from wheel speed sensors 34a and 34b that respectively measure rotational speeds of the left front wheel 62a and the right front wheel 62b as drive wheels and a left rear wheel speed Vrl and a right rear wheel speed Vrr from wheel speed sensors 36a and 36b that respectively measure rotational speeds of the left rear wheel 64a and the right rear wheel 64b as driven wheels. The brake ECU 50 outputs control signals to the brake actuator 52 via its output port. The brake ECU 50 establishes communication with the main electronic control unit 70 via its communication port to activate and control the brake actuator 52 in response to control signals from the main electronic control unit 70 and to send input data to the main electronic control unit 70 according to the requirements.

The main electronic control unit 70 is constructed as a microprocessor including a CPU 72, a ROM 74 that stores processing programs, a RAM 76 that temporarily stores data, non-illustrated input and output ports, and a non-illustrated communication port. The main electronic control unit 70 receives, via its input port, various input signals including a rotational position θm from a rotational position detection sensor 32 (for example, a resolver) that detects the rotational position of the drive shaft 28 (the rotating shaft of the motor 22), a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, a rudder angle θst from a rudder angle sensor 88, and a road surface gradient θgr from a slope sensor 89. The main electronic control unit 70 outputs switching control signals to the switching elements included in the inverter circuit 24 via its output port.

Figure 2:
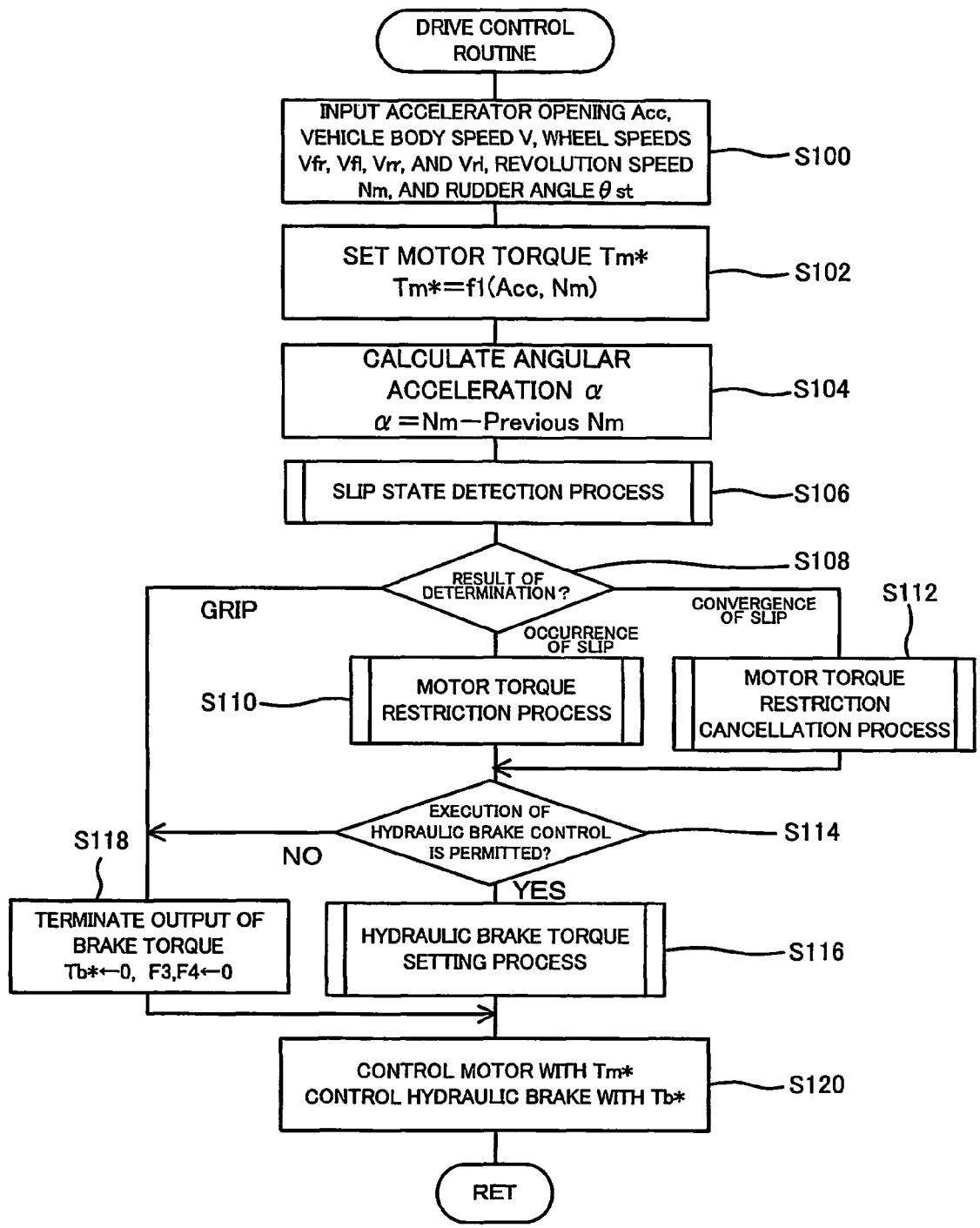
FIG. 2 is a flowchart showing a drive control routine executed by a main electronic control unit 70 in the vehicle 20 of the embodiment.

The following describes series of operations of the vehicle 20 of the embodiment constructed as discussed above. FIG. 2 is a flowchart showing a drive control routine executed by the main control unit 70 in the vehicle 20 of the embodiment. This routine is carried out repeatedly at preset time intervals (for example, 8 msec).

When the drive control routine starts, the CPU 72 of the main electronic control unit 70 first inputs various data required for control, that is, the accelerator opening Acc measured by the accelerator pedal position sensor 84, the left front wheel speed Vfl, the right front wheel speed Vfr, the left rear wheel speed Vrl, and the right rear wheel speed Vrr measured by the wheel speed sensors 34a, 34b, 36a, and 36b, a revolution speed Nm of the drive shaft 28, a vehicle body speed V, the rudder angle θst measured by the rudder angle sensor 88, the gearshift position SP detected by the gearshift position sensor 82, and the brake pedal position BP detected by the brake pedal position sensor 86 (step S100). In this embodiment, the input of the revolution speed Nm of the drive shaft 28 is calculated from the rotational position θm of the drive shaft 28 detected by the rotational position detection sensor 32. The vehicle body speed V is the average of the left and right rear wheel speeds Vrl and Vrr (V=(Vrl+Vrr)/2).

Figure 3:
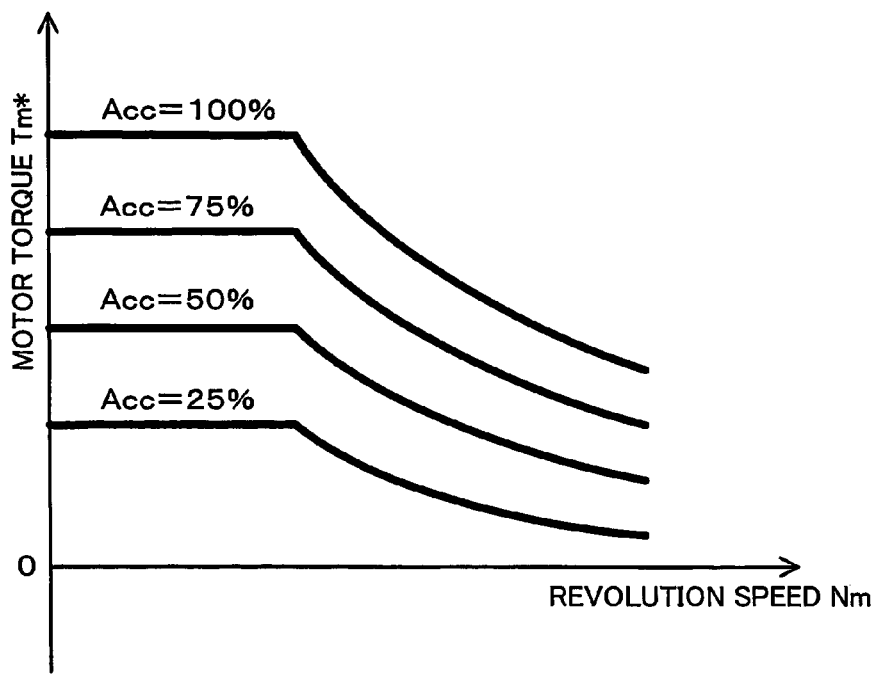
FIG. 3 is a map showing variations in motor torque Tm* against accelerator opening Acc and vehicle speed V.

The routine then sets a motor torque Tm*, which is to be output from the motor 22, based on the inputs of the accelerator opening Acc and the revolution speed Nm of the drive shaft 28 (the rotating shaft of the motor 22) (step S102). In the structure of this embodiment, variations in motor torque Tm* against the accelerator opening Acc and the revolution speed Nm are specified in advance and are stored as a map in the ROM 74. The procedure of the embodiment reads and sets the motor torque Tm* corresponding to the given accelerator opening Acc and the given revolution speed Nm from the stored map. FIG. 3 shows one example of this map.

The routine subsequently calculates an angular acceleration $\alpha$ of the drive shaft 28 from the inputs of the revolution speed Nm (step S104). The angular acceleration $\alpha$ is computed by subtracting a previous revolution speed Nm input in the previous cycle of this routine from a current revolution speed Nm input in the current cycle of this routine (current revolution speed Nm—previous revolution speed Nm). The unit of the angular acceleration $\alpha$ in this embodiment is [rpm/8 msec], as the revolution speed Nm is expressed by the revolutions per minute [rpm] and the time interval of execution of this routine is 8 msec. Any other suitable unit may be adopted to express the angular acceleration as a time variation in angular velocity. With a view to reducing a potential error, the angular acceleration $\alpha$ may be the average of current and past data of the angular acceleration calculated in the current and several past cycles (for example, three past cycles) of this routine.

Figure 4:
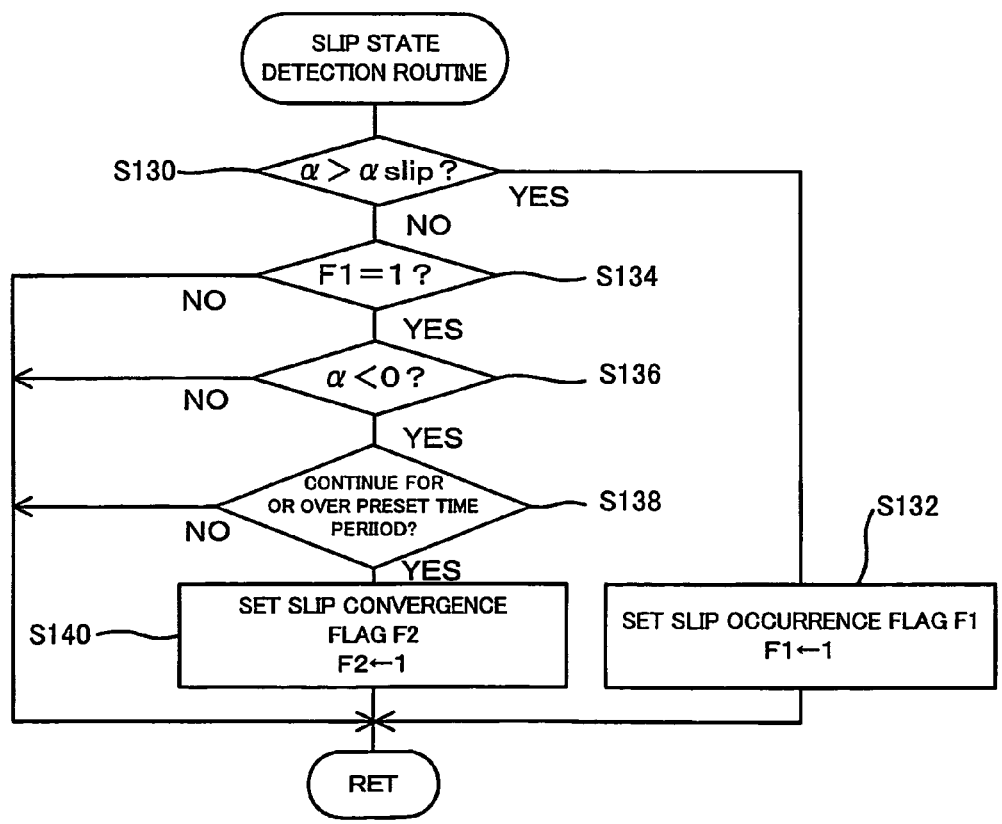
FIG. 4 is a flowchart showing a slip state detection routine executed by the main electronic control unit 70 in the vehicle 20 of the embodiment.

After calculation of the angular acceleration $\alpha$, the routine executes a slip state detection process to detect the state of a slip of the left and right front wheels 62a and 62b, based on the calculated angular acceleration $\alpha$ (step S106). The slip state detection process is carried out according to a slip state detection routine of FIG. 4. The description of the drive control routine in the flowchart of FIG. 2 is interrupted now, and the slip state detection routine of FIG. 4 is discussed here. When the slip state detection routine starts, the CPU 72 of the main electronic control unit 70 first determines whether the angular acceleration $\alpha$ calculated at step S104 in the routine of FIG. 2 exceeds a threshold value $\alpha$slip, which is used to assume the occurrence of a slip due to the wheelspin (step S130). When it is determined that the calculated angular acceleration $\alpha$ exceeds the threshold value $\alpha$slip, the routine detects the occurrence of a slip due to the spin of the left and right front wheels 62a and 62b and sets the value '1' to a slip occurrence flag F1 representing the occurrence of a slip (step S132). The slip state detection routine is then terminated. When it is determined that the calculated angular acceleration $\alpha$ does not exceed the threshold value $\alpha$slip, on the other hand, the routine checks the value of the slip occurrence flag F1 (step S134). When the slip occurrence flag F1 is equal to 1, the routine successively determines whether the angular acceleration $\alpha$ takes a negative value and whether the negative setting of the angular acceleration $\alpha$ continues for a preset time period (steps S136 and S138). When it is determined that the angular acceleration $\alpha$ takes a negative value and that the negative setting of the angular acceleration $\alpha$ continues for the preset time period, the routine detects convergence of the slip occurring on the left and right front wheels 62a and 62b and sets the value '1' to a slip convergence flag F2 (step S140). The slip state detection routine is then terminated. When it is determined that the slip occurrence flag F1 is not equal to 1, the slip state detection routine detects a grip state of the left and right front wheels 62a and 62b, before being terminated. When it is determined that the angular acceleration $\alpha$ does not take a negative value or that the negative setting of the angular acceleration $\alpha$ does not continue for the preset time period under the setting of the slip occurrence flag F1 equal to 1, the slip state detection routine detects no convergence of the slip, before being terminated.

Referring back to the flowchart of FIG. 2, the drive control routine executes a series of processing according to the result of the slip state detection process (step S108). In response to detection of the grip state where both the slip occurrence flag F1 and the slip convergence flag F2 are equal to 0, the routine sets the value '0' to a brake torque Tb*, a left wheel slip occurrence flag F3, and a right wheel slip occurrence flag F4, which will be discussed later, to terminate output of the brake torque Tb* (step S118). The drive control routine drives and controls the motor 22 with the setting of the motor torque Tm*, while actuating and controlling the hydraulic brakes 54a and 54b with the setting of the brake torque Tb* (step S120), before being terminated. The motor 22 is driven and controlled by outputting the switching control signals to the switching elements included in the inverter circuit 24. The brake ECU 50 receiving the input of the brake torque Tb* outputs a control signal to the brake actuator 52 to actuate and control the brake actuator 52. In response to detection of the occurrence of a slip where the slip occurrence flag F1 is equal to 1 and the slip convergence flag F2 is equal to 0, the drive control routine carries out a motor torque restriction process to restrict the motor torque Tm* set at step S102 (step S110). In response to detection of the convergence of a slip where both the slip occurrence flag F1 and the slip convergence flag F2 are equal to 1, the drive control routine carries out a motor torque restriction cancellation process to cancel the restriction of the motor torque Tm* by the motor torque restriction process (step S112). The details of the motor torque restriction process and the motor torque restriction cancellation process will be discussed later.

Subsequent to execution of the motor torque restriction process at step S110 or the motor torque restriction cancellation process at step S112, the drive control routine determines whether execution of control of the hydraulic brakes 54a and 54b (hydraulic brake control) attached to the left and right front wheels 62a and 62b is permitted (step S114). The permission for execution of the hydraulic brake control depends upon determination of whether all of preset conditions are fulfilled. The preset conditions include that the current position of the gearshift lever 81 is in a forward drivable range, that is, in either a D range or a B range, that the driver is stepping on the accelerator pedal 83 to cause the motor torque Tm* set at step S102 to be not less than a predetermined level, that the hydraulic brake control does not interfere with another braking control, for example, the driver's step-off action of the brake pedal 85, that the battery 26 is in a favorable state of charge, and that the brake ECU 50 and the brake actuator 52 are in their normal state. The preset conditions also include a hydraulic brake control prohibiting condition to prohibit execution of the hydraulic brake control in the course of a hydraulic brake torque setting process discussed later with reference to the flowchart of FIG. 5. In the case of permission of the hydraulic brake control, the drive control routine executes a hydraulic brake torque setting process that determines whether the slip of the left and right front wheels 62a and 62b is caused by spin of one of the left and right front wheels 62a and 62b (single wheel) and sets the brake torque Tb* to output a braking torque to the spinning wheel (step S116). The details of the hydraulic brake torque setting process are discussed below.

Figure 5:
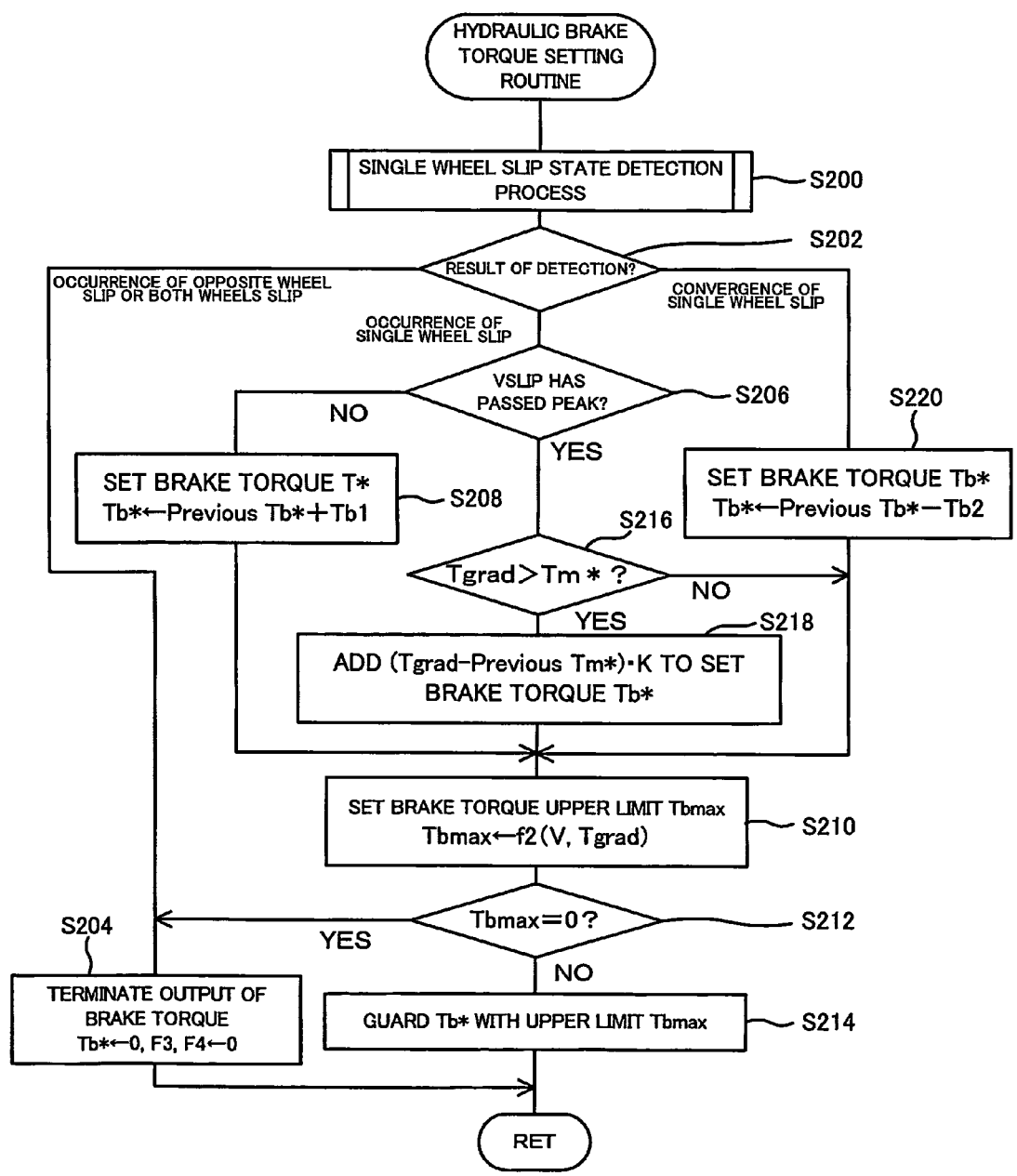
FIG. 5 is a flowchart showing a hydraulic brake torque setting routine executed by the main electronic control unit 70 in the vehicle 20 of the embodiment.
Figure 6:
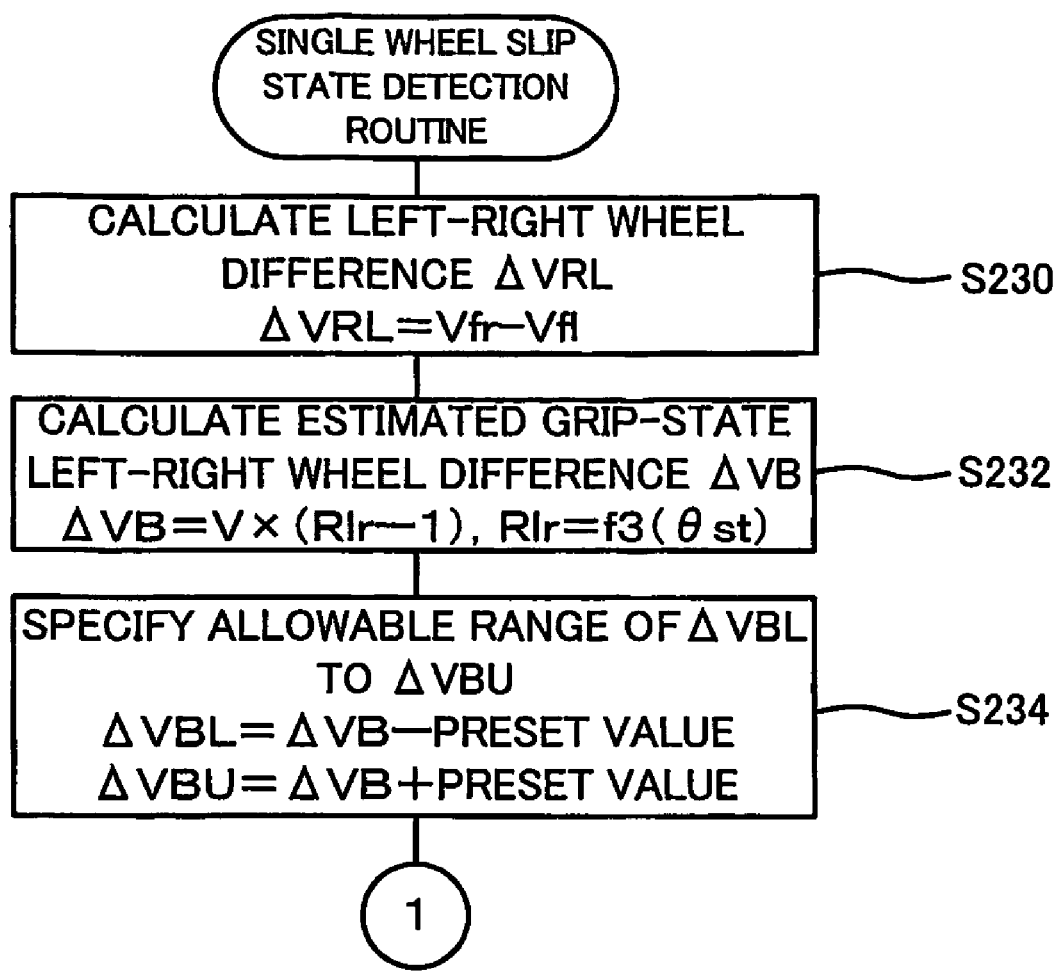
FIG. 6 is a flowchart showing former part of a single wheel slip state detection routine executed by the main electronic control unit 70 in the vehicle 20 of the embodiment.

FIG. 5 is a flowchart showing a hydraulic brake torque setting routine executed by the main electronic control unit 70 in the vehicle 20 of the embodiment. The hydraulic brake torque setting routine first executes a single wheel slip state detection process to detect the state of a slip of one of the left and right front wheels 62a and 62b (single wheel) (step S200). The single wheel slip state detection process is carried out according to a single wheel slip state detection routine shown in FIGS. 6 and 7. The single wheel slip state detection routine first subtracts the left front wheel speed Vfl from the right front wheel speed Vfr, which are both input at step S100 in the drive control routine of FIG. 2, to calculate a left-right wheel difference ΔVRL (observed value) (step S230). The routine then sets a left-right wheel ratio Rlr based on the rudder angle θst input at step S100 in the routine of FIG. 2, and calculates an estimated grip-state left-right wheel difference ΔVB, which represents an expected difference between the left front wheel speed Vfl and the right front wheel speed Vfr caused by the rudder angle θst in the grip state of the left and right front wheels 62a and 62b, from the setting of the left-right wheel ratio Rlr and the input vehicle body speed V according to Equation (1) given below (step S232). In the structure of this embodiment, a variation in left-right wheel ratio Rlr against the rudder angle θst is specified in advance and is stored as a map in the ROM 74. The procedure of this embodiment reads and sets the left-right wheel ratio Rlr corresponding to the given rudder angle θst from the stored map. FIG. 8 shows one example of this map. In this embodiment, the rudder angle θst is directly measured by the rudder angle sensor 88. The ratio of the left rear wheel speed Vrl of the left rear driven wheel 64a to the right rear wheel speed Vrr of the right rear driven wheel 64b is one-to-one mapped to the rudder angle θst. The rudder angle θst may thus be estimated from this ratio.

$$\Delta VB = V \cdot (Rlr - 1) \tag{1}$$

After the calculation of the estimated grip-state left-right wheel difference ΔVB, the routine adds a preset value to the estimated grip-state left-right wheel difference ΔVB to specify an upper limit ΔVBU and subtracts a preset value from the estimated grip-state left-right wheel difference ΔVB to specify a lower limit ΔVBL (step S234). The routine subsequently determines whether the left-right wheel difference ΔVRL (observed value) calculated at step S230 is within an allowable range defined by the settings of the upper limit ΔVBU and the lower limit ΔVBL (step S236).

As one example, it is assumed that only the left front wheel 62a spins. In this case, it is determined at step S236 that the observed left-right wheel difference ΔVRL is less than the lower limit ΔVBL. The routine then determines whether the product of the revolution speed Nm of the drive shaft 28 input at step S100 in the routine of FIG. 2 and a conversion coefficient k (a coefficient for conversion into the revolution speed of the left and right front wheels 62a and 62b) is in a range defined by the input right front wheel speed Vfr and the input left front wheel speed Vfl and thereby validates the determination of step S236 (step S238). In the case of acknowledged validity, the routine determines whether the right wheel slip occurrence flag F4 is equal to 1 (step S240). At this moment, only the left front wheel 62a spins. Setting the right wheel slip occurrence flag F4 equal to '1' thus means that the left front wheel 62a as the opposite wheel spins after the right front wheel 62b has spun and the occurrence of a slip of the right front wheel 62b has been detected. When the right wheel slip occurrence flag F4 is not equal to 1, the routine subsequently determines whether the left wheel slip occurrence flag F3 is equal to 1 (step S242). When the left wheel slip occurrence flag F3 is not equal to 1, the routine determines whether the spin of the left front wheel 62a continues for a preset time period (for example, 50 msec) (step S244). When it is determined at step S242 that the left wheel slip occurrence flag F3 is equal to 1 or when it is determined at step S244 that the spin of the left front wheel 62a continues for the preset time period, the routine detects a slip of the left front wheel 62a (single wheel slip) and sets the value '1' to the left wheel slip occurrence flag F3 (step S246). The routine sets the left front wheel speed Vfl input at step S100 in the routine of FIG. 2 to a slip wheel speed VSLIP (step S248), before being terminated. When it is determined at step S244 that the spin of the left front wheel 62a does not continue for the preset time period, on the other hand, the routine is terminated without detection of a slip of the left front wheel 62a. When it is determined at step S240 that the right wheel slip occurrence flag F4 is equal to 1, the left front wheel 62a as the opposite wheel spins after the right front wheel 62b has spun and the occurrence of a slip of the right front wheel 62b has been detected, as mentioned above. The routine accordingly detects an opposite wheel slip (step S250), before being terminated.

In another example, it is assumed that only the right front wheel 62b spins. In this case, it is determined at step S236 that the observed left-right wheel difference ΔVRL is greater than the upper limit ΔVBU. Like the processing in the case where only the left front wheel 62a spins (steps S238 through S250), the routine determines whether the product of the revolution speed Nm input at step S100 in the routine of FIG. 2 and the conversion coefficient k is in a range defined by the input left front wheel speed Vfl and the input right front wheel speed Vfr for the purpose of validation (step S252). In the case of acknowledged validity, the routine determines whether the left wheel slip occurrence flag F3 is equal to 1 (step S254). When the left wheel slip occurrence flag F3 is not equal to 1, the routine determines whether the right wheel slip occurrence flag F4 is equal to 1 (step S256). When the right wheel slip occurrence flag F4 is not equal to 1, the routine determines whether the spin of the right front wheel 62b continues for a preset time period (for example, 50 msec) (step S258). When it is determined at step S256 that the right wheel slip occurrence flag F4 is equal to 1 or when it is determined at step S258 that the spin of the right front wheel 62b continues for the preset time period, the routine detects a slip of the right front wheel 62b (single wheel slip) and sets the value '1' to the right wheel slip occurrence flag F4 (step S260). The routine sets the right front wheel speed Vfr input at step S100 in the routine of FIG. 2 to the slip wheel speed VSLIP (step S262), before being terminated. When it is determined at step S258 that the spin of the right front wheel 62b does not continue for the preset time period, on the other hand, the routine is terminated without detection of a slip of the right front wheel 62b. When it is determined at step S254 that the left wheel slip occurrence flag F3 is equal to 1, the routine detects an opposite wheel slip (step S264), before being terminated.

In still another example, it is assumed that there is no spin of only the left front wheel 62a or only the right front wheel 62b (no single wheel spin). In this case, it is determined at step S236 that the observed left-right wheel difference ΔVRL is within the allowable range defined by the lower limit ΔVBL and the upper limit ΔVBU. The routine then determines whether either the left wheel slip occurrence flag F3 or the right wheel slip occurrence flag F4 is equal to 1 (step S266). When either of the flags F3 and F4 is equal to 1, the routine determines whether the state of no single wheel spin continues for a preset time period (for example, 1 sec) (step S268). When it is determined that the state of no single wheel spin continues for the preset time period, the routine detects convergence of a single wheel slip (step S270), before being terminated. When it is determined at step S266 that neither the left wheel slip occurrence flag F3 nor the right wheel slip occurrence flag F4 is equal to 1 (when both the flags F3 and F4 are equal to 0), the routine detects no occurrence of any single wheel slip, before being terminated. When it is determined at step S268 that the state of no single wheel spin does not continue for the preset time period, the routine is terminated without detection of the convergence of a single wheel slip. The single wheel slip state detection process is carried out in this manner.

Referring back to the flowchart of FIG. 5, the hydraulic brake toque setting routine sets the brake torque Tb* according to the result of the single wheel slip state detection process of step S200 (step S202). In response to detection of no occurrence of a single wheel slip, the routine sets the value '0' to the brake torque Tb* as well as to the left wheel slip occurrence flag F3 and the right wheel slip occurrence flag F4, so as to stop the output of the brake torque from the hydraulic brakes 54a and 54b (step S204), before being terminated.

Figure 9:
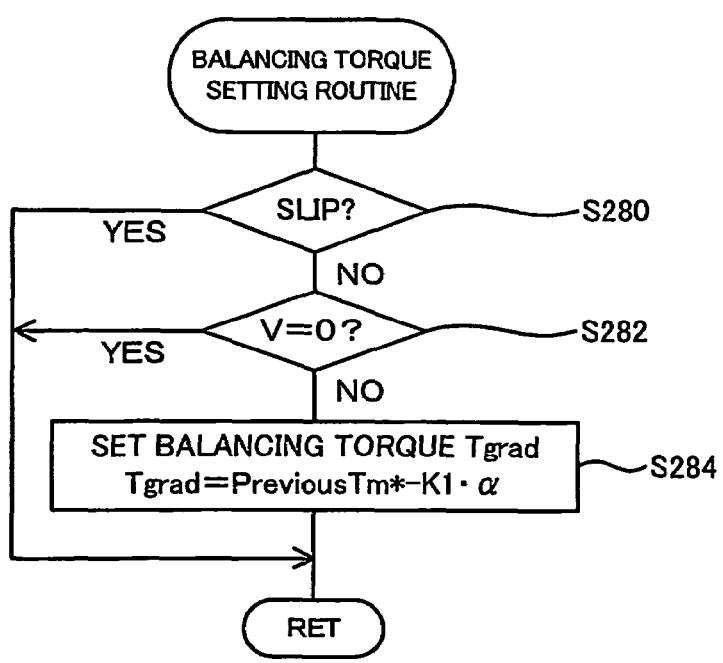
FIG. 9 is a flowchart showing a balancing torque setting routine executed by the main electronic control unit 70 in the vehicle 20 of the embodiment.

In response to detection of the occurrence of a single wheel slip at step S202 where either the left wheel slip occurrence flag F3 or the right wheel slip occurrence flag F4 is equal to 1, the routine determines whether the slip wheel speed VSLIP has passed a peak (step S206). When the slip wheel speed VSLIP has not yet passed the peak, the routine adds a preset value Tb1 to the previous brake torque Tb* set in the previous cycle of this routine to set a brake torque Tb* to be output to the spinning wheel (step S208). Until the slip wheel speed VSLIP reaches the peak, the brake torque Tb* to be output to the spinning wheel is gradually incremented by the preset value Tb1 with elapse of time since the occurrence of a single wheel slip. The preset value Tb1 is specified, for example, to increment the brake torque Tb* at a rate of 50 Nm/50 msec. When it is determined that the slip wheel speed VSLIP has already passed the peak, on the other hand, the routine determines whether a balancing torque Tgrad equivalent to a road surface gradient θgr is greater than the motor torque Tm* restricted at step S112 or step S110 in the routine of FIG. 2 (step S216). When the balancing torque Tgrad is greater than the restricted motor torque Tm*, the routine adds a torque insufficiency relative to the balancing torque Tgrad to set the brake torque Tb* (step S218). In this embodiment, the balancing torque Tgrad is set according to a balancing torque setting routine shown in the flowchart of FIG. 9. When no slip occurs on the left and right front wheels 62a and 62b (step S280) and the vehicle body speed V is not equal to zero (step S282), the routine sets the balancing torque Tgrad, based on an acceleration of the vehicle 20 and an output torque to the vehicle 20 (step S284). The procedure of the embodiment calculates the balancing torque Tgrad from an angular acceleration α, which represents the acceleration of the vehicle 20, and the previous motor torque Tm*, which is used for the processing of step S120 in the previous cycle of the routine of FIG. 2 as the output torque to the vehicle 20, according to Equation (2) given below. 'K1' in Equation (2) denotes a constant depending upon the weight of the vehicle 20 and the diameter of the left and right front wheels 62a and 62b. Regulation of the brake torque Tb* to be output to the spinning wheel by taking into account the road surface gradient θgr enables the torque of the motor 22 to be output to the non-spinning wheel as the torque required for a start or acceleration of the vehicle according to the road surface gradient θgr. This improves the starting performance and the accelerating performance of the vehicle.

$$Tgrad = \text{Previous } Tm^* - K1 \cdot \alpha \quad (2)$$

In response to detection of the convergence of a single wheel slip at step S202, the routine subtracts a preset value Tb2 from the brake torque Tb* set at step S208 or step S218 to set the brake torque Tb* (step S220). In the event of the convergence of a single wheel slip, output of the brake torque Tb* to the spinning wheel is decremented by the preset value Tb2 and is eventually terminated. The preset value Tb2 is specified, for example, to decrement the brake torque Tb* at a rate of 100 Nm/1 sec.

Figure 10:
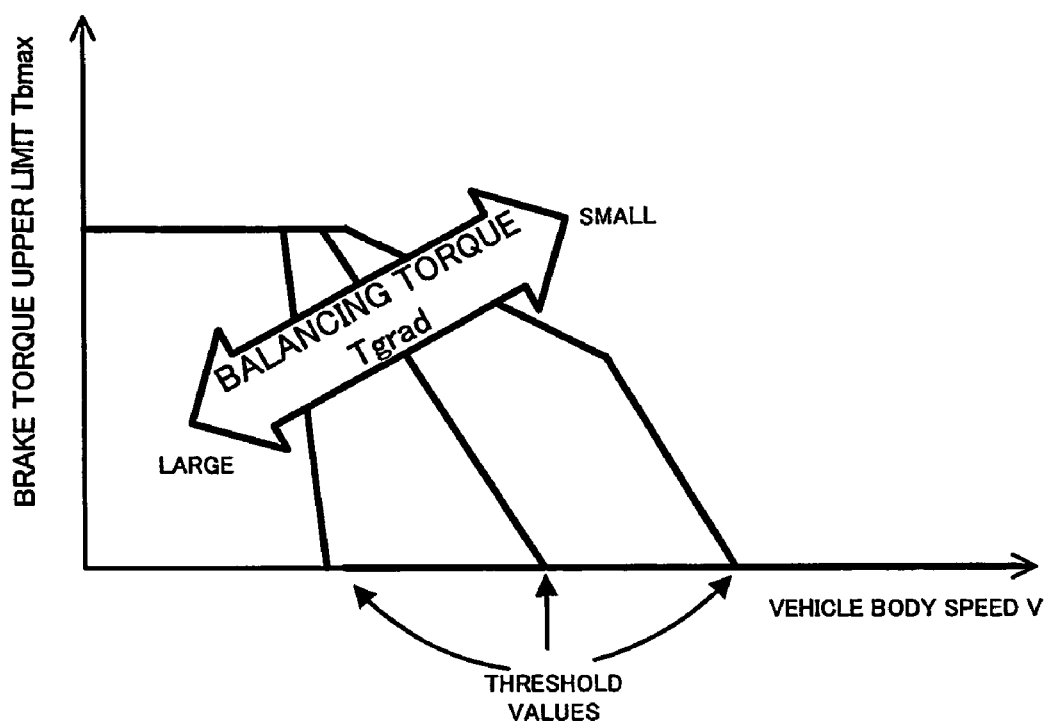
FIG. 10 is a map showing variations in brake torque upper limit Tbmax against the vehicle body speed V and the balancing toque Tgrad.

After setting the brake torque Tb*, the routine sets a brake torque upper limit Tbmax as an allowable upper limit of brake torque to be output to the spinning wheel out of the left and right front wheels 62a and 62b, based on the input vehicle body speed V and the setting of the balancing torque Tgrad (step S210). In the structure of this embodiment, variations in brake torque upper limit Tbmax against the vehicle body speed V and the balancing torque Tgrad are specified in advance and are stored as a map in the ROM 74. The procedure of this embodiment reads and sets the brake torque upper limit Tbmax corresponding to the given vehicle body speed V and the given balancing torque Tgrad from the stored map. FIG. 10 shows one example of this map. The brake torque upper limit Tbmax is set to decrease with an increase in vehicle body speed V after exceeding a preset level and with an increase in balancing torque Tgrad, as shown in the map. The procedure of the embodiment sets the brake torque Tb* in the minimum possible effective range against the occurrence of a single wheel slip and controls the hydraulic brakes 54a and 54b.

The routine subsequently determines whether the setting of the brake torque upper limit Tbmax is equal to 0 (step S212). When the setting of the brake torque upper limit Tbmax is equal to 0, the routine sets the value '0' to the brake torque Tb*, as well as to the left wheel slip occurrence flag F3 and the right wheel slip occurrence flag F4 to stop output of the brake torque (step S204), before being terminated. The brake torque upper limit Tbmax is set equal to 0 when the vehicle body speed V exceeds a threshold value (where the threshold value increases with a decrease in balancing toque Tgrad), as shown in the map of FIG. 10. At this moment, output of the brake torque is terminated. When the setting of the brake torque upper limit Tbmax is not equal to 0, on the other hand, the routine guards the brake torque Tb* with the brake -torque upper limit Tbmax as the upper limit (step S214), before being terminated. On completion of this routine, step S120 in the drive control routine of FIG. 2 drives and controls the motors 22 with the motor torque Tm* restricted at step S110 or step S112, while actuating and controlling the brake actuator 52 to activate the hydraulic brake 54a or 54b corresponding to the spinning wheel to output a torque corresponding to the setting of the brake torque Tb*.

Figure 7:
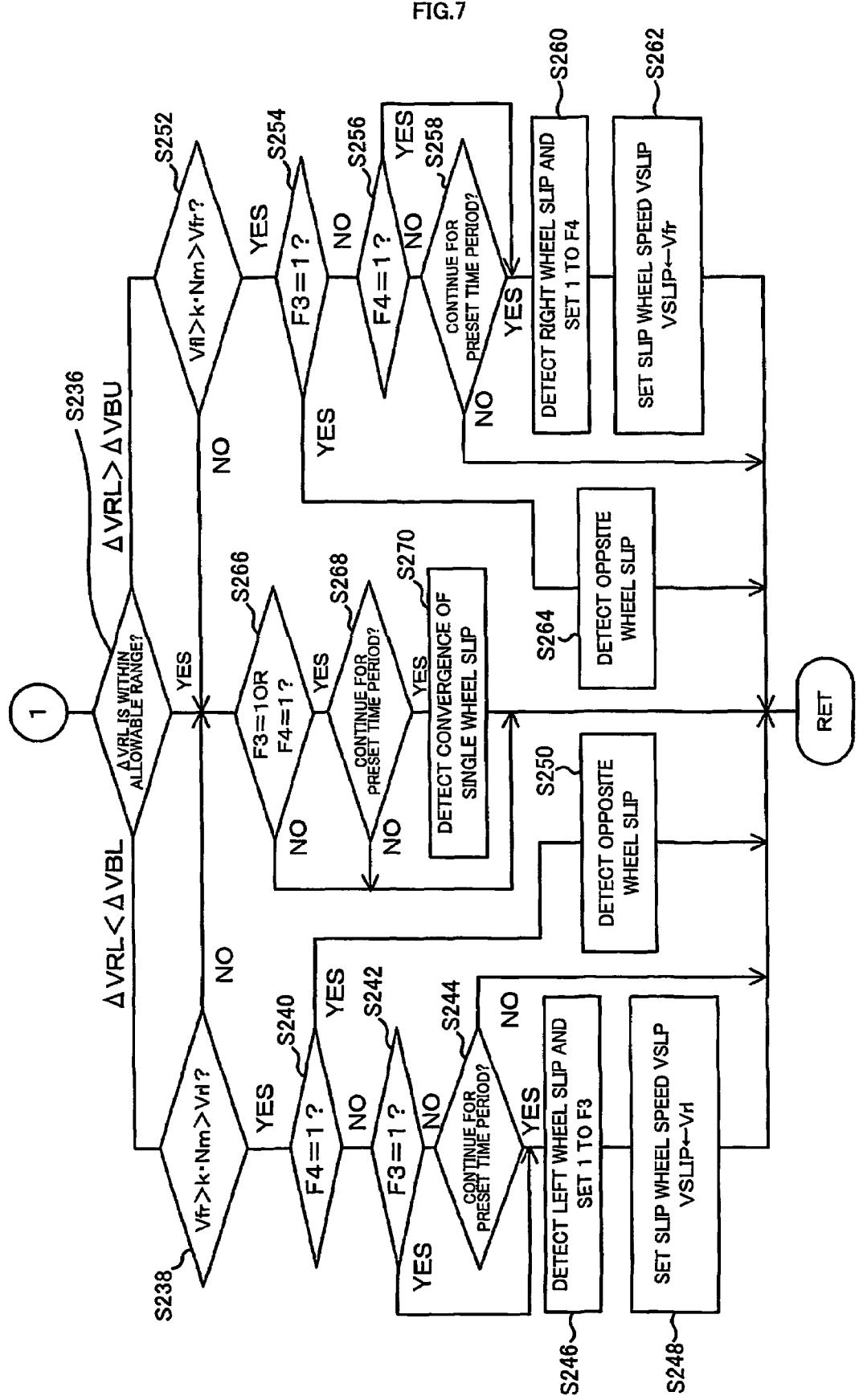
FIG. 7 is a flowchart showing latter part of the single wheel slip state detection routine executed by the main electronic control unit 70 in the vehicle 20 of the embodiment.
Figure 8:
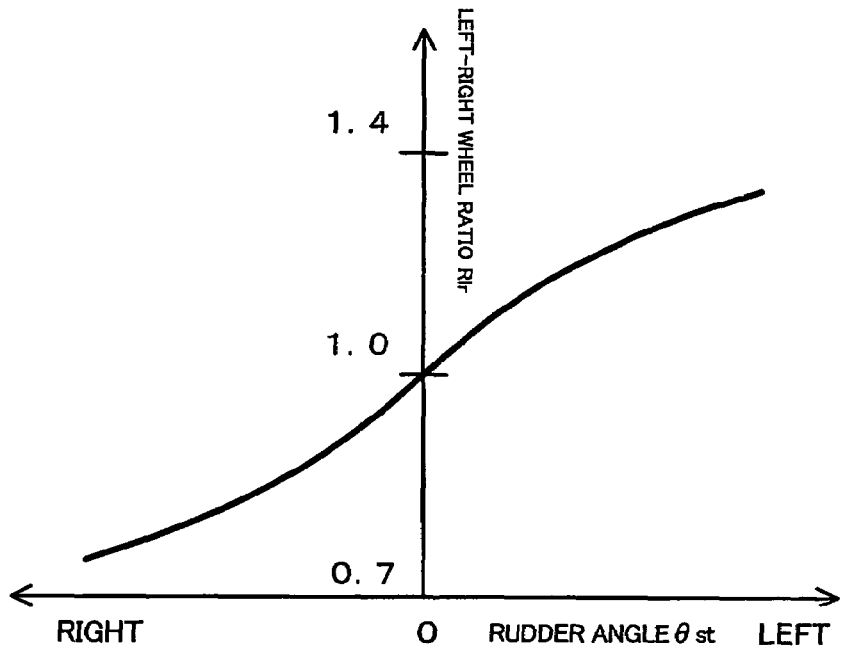
FIG. 8 is a map showing a variation in left-right wheel ratio Rlr against the rudder angle θst.

In response to detection of the occurrence of an opposite wheel slip at step S250 or step S264 in the single wheel slip state detection routine of FIG. 7, execution of the hydraulic brake control is required anew. The routine accordingly sets the value '0' to the brake torque Tb*, as well as to the left wheel slip occurrence flag F3 and the right wheel slip occurrence flag F4 to stop output of the brake torque (step S204), before being terminated.

Figure 11:
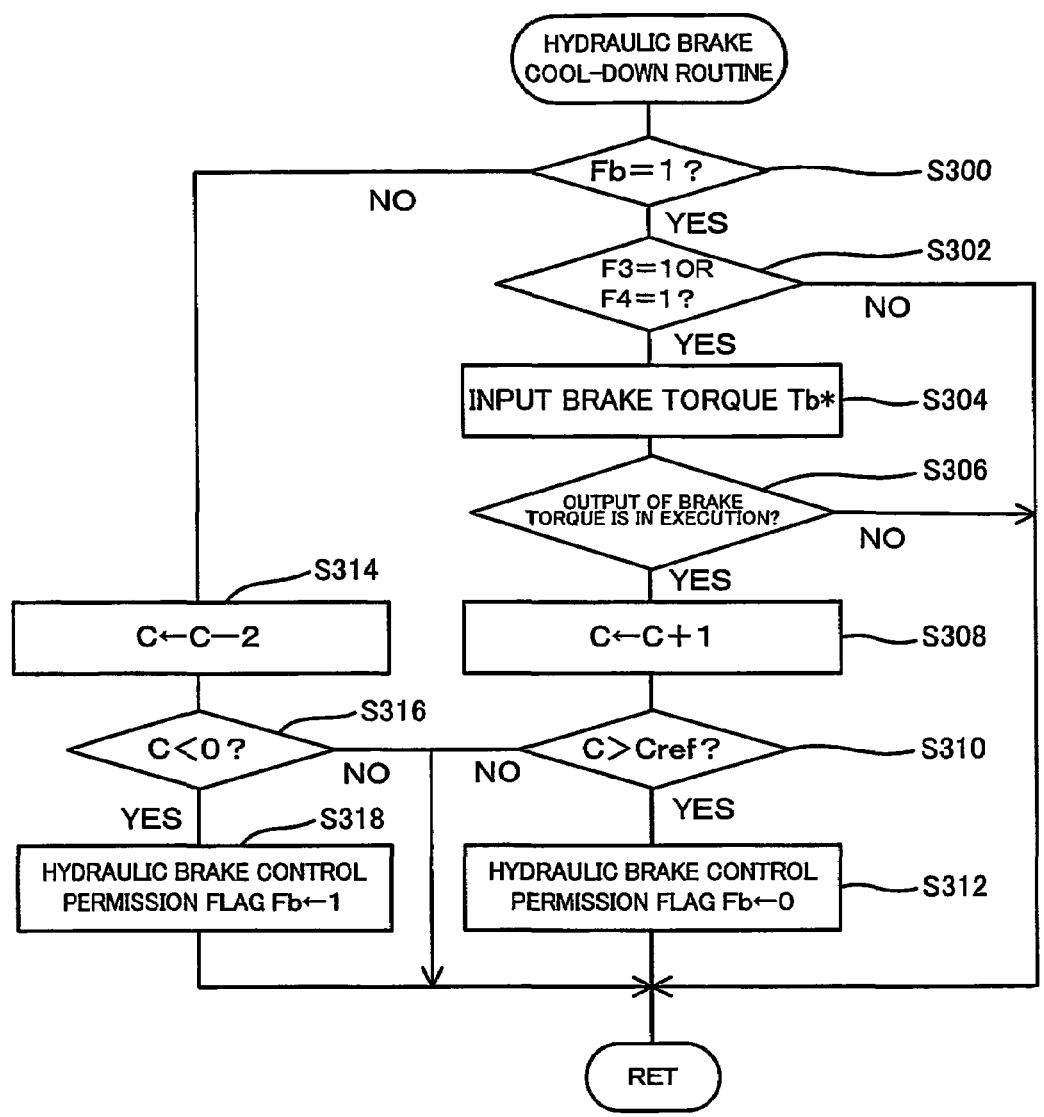
FIG. 11 is a flowchart showing a hydraulic brake cooldown routine executed by the main electronic control unit 70 in the vehicle 20 of the embodiment.

The following describes the process of setting a hydraulic brake control permission flag Fb in the course of continuous output of the brake torque Tb* to the spinning wheel by the hydraulic brake 54a or 54b, as one of the preset conditions for execution of the hydraulic brake control at step S11. FIG. 11 is a flowchart showing a hydraulic brake cool-down routine executed by the main electronic control unit 70 in the vehicle 20 of the embodiment. This routine is repeatedly carried out at preset time intervals. The hydraulic brake cool-down routine first determines whether the hydraulic brake control permission flag Fb is equal to 1 (step S300). When the hydraulic brake control permission flag Fb is equal to 1, the routine subsequently determines whether either the left wheel slip occurrence flag F3 or the right wheel slip occurrence flag F4 is equal to 1 (step S302). When either of the flags F3 and F4 is equal to 1, the routine inputs the brake torque Tb* set in the hydraulic brake torque setting routine of FIG. 5 (step S304) and determines whether output of the brake torque is in execution (step S306). When it is determined that output of the brake torque is in execution, the routine increments a count on a counter C, which represents an output time of the brake torque, by '1' (step S308) and compares the count on the counter C with a threshold value Cref (step S310). Here the threshold value Cref is specified in advance experimentally or by another suitable method (for example, 30 sec) as a possible overheat time of the hydraulic brake 54a or 54b due to the output of the brake torque Tb*. When it is determined that the count on the counter C exceeds the threshold value Cref, the routine determines that the long-time output of the brake torque may overheat the hydraulic brake 54a or 54b and sets the value '0' to the hydraulic brake control permission flag Fb (step S312), before being terminated. In this case, execution of the hydraulic brake control is not permitted at step S114 in the drive control routine of FIG. 2. The drive control routine thus sets the value '0' to the brake torque Tb*, as well as to the left wheel slip occurrence flag F3 and the right wheel slip occurrence flag F4 (step S118). This series of processing effectively prevents overheat of the hydraulic brakes 54a and 54b. When it is determined at step S302 that both the left wheel slip occurrence flag F3 and the right wheel slip occurrence flag F4 are equal to 0, when the brake torque Tb* input at step S304 is equal to 0 and it is determined at step S306 that output of the brake torque is not in execution, or when it is determined at step S310 that the count on the counter C does not exceed the threshold value Cref, the routine determines no possibility of overheat of the hydraulic brakes 54a and 54b and is terminated immediately.

Figure 12:
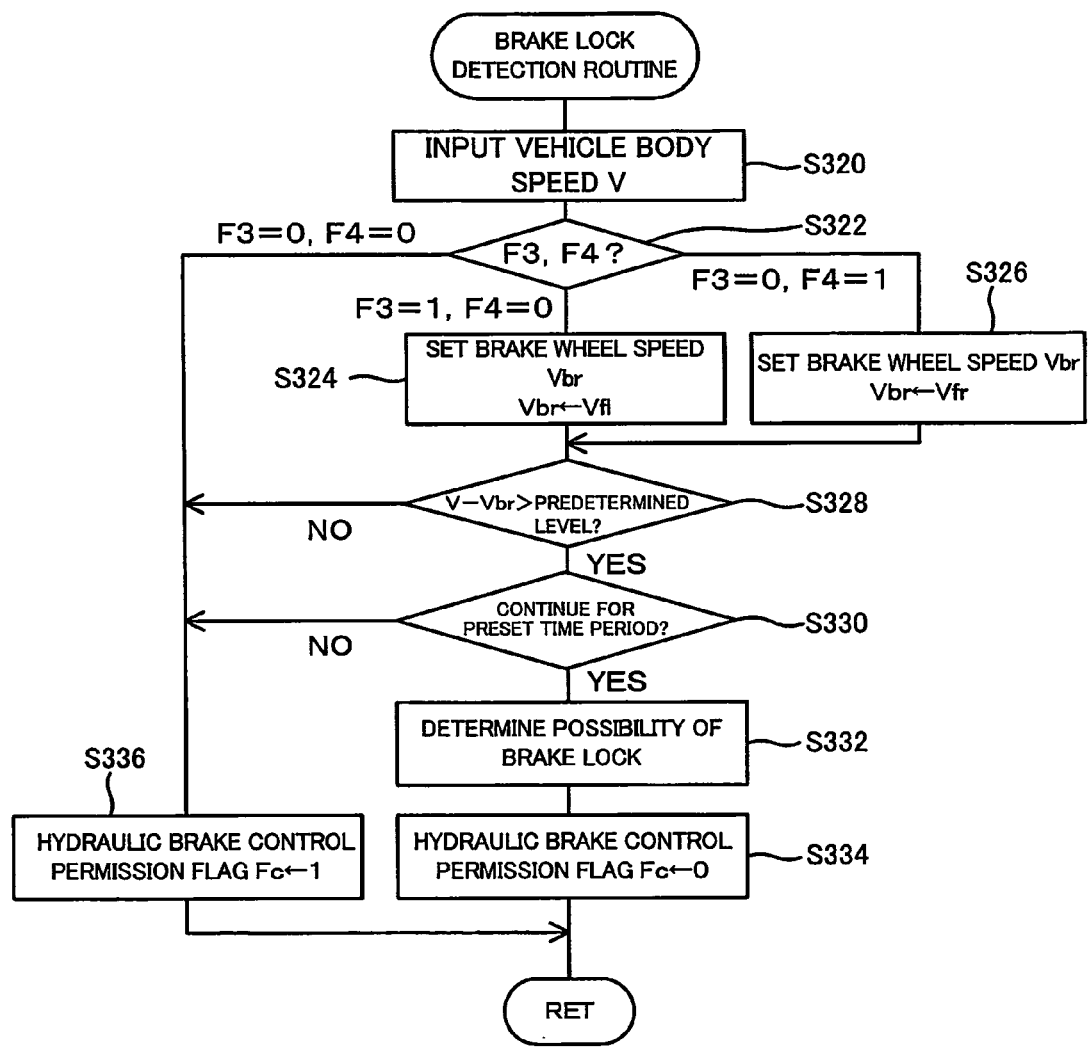
FIG. 12 is a flowchart showing brake lock detection routine executed by the main electronic control unit 70 in the vehicle 20 of the embodiment.

When it is determined at step S300 that the hydraulic brake control permission flag Fb is not equal to 1, execution of the hydraulic brake control is not permitted at step S114 in the drive control routine of FIG. 2. The routine accordingly decrements the count on the counter C by '2' (step S314) and determines that the count on the counter C becomes less than 0 (step S316). The count on the counter C of less than 0 means that the hydraulic brakes 54a and 54b are sufficiently cooled down and that there is no possibility of overheat of the hydraulic brakes 54a and 54b. The routine accordingly sets the value '1' to the hydraulic brake control permission flag Fb (step S318) and is terminated. This series of processing cancels prohibition of the hydraulic brake control for the possible overheat of the hydraulic brake 54a or 54b. The rate of decrement from the count on the counter C is set by experimentally or otherwise specifying the required cool-down time of the hydraulic brakes 54a and 54b. The procedure of this embodiment decrements '2' from the count on the counter C. The time to cancel the prohibition of the hydraulic brake control is thus half the time to determine the possible overheat since the start of output of the brake torque. determines whether the result of subtraction of the brake wheel speed Vbr from the input vehicle body speed V is not less than a predetermined level (step S328). When the difference is not less than the predetermined level, the routine subsequently determines that this referent state continues for a preset time period (step S330). In the event that the result of subtraction of the brake wheel speed Vbr from the vehicle body speed V is not less than the predetermined level and this referent state continues for the preset time period, the routine determines the possibility of lock of the wheel due to output of the brake torque by the hydraulic brake 54a or 54b (step S332). The routine accordingly sets the value '0' to the hydraulic brake control permission flag Fc (step S334), before being terminated. In this case, execution of the hydraulic brake control is not permitted at step S114 in the drive control routine of FIG. 2. The drive control routine thus sets the value '0' to the brake torque Tb*, as well as to the left wheel slip occurrence flag F3 and the right wheel slip occurrence flag F4 (step S118). This series of processing effectively prevents the vehicle 20 from falling into an unstable attitude by the lock of the wheel. When it is determined at step S322 that both the left wheel slip occurrence flag F3 and the right wheel slip occurrence flag F4 are equal to 0, when it is determined at step S328 that the result of subtraction of the brake wheel speed Vbr from the vehicle body speed V is less than the predetermined level, or when it is determined at step S330 that the referent state The following describes the process of setting a hydraulic brake control permission flag Fc in the event of lock of a wheel due to output of the brake torque to the spinning wheel by the hydraulic brake 54a or 54b, as one of the preset conditions for execution of the hydraulic brake control at step S114. FIG. 12 is a flowchart showing a brake lock detection routine executed by the main electronic control unit 70 in the vehicle 20 of the embodiment. This routine is repeatedly carried out at preset time intervals. When the brake lock detection routine starts, the CPU 72 of the main electronic control unit 70 first inputs the vehicle body speed V (step S320) and checks the values of the left wheel slip occurrence flag F3 and the right wheel slip occurrence flag F4 (step S322). When the left wheel slip occurrence flag F3 is equal to 1 and the right wheel slip occurrence flag F4 is equal to 0, that is, in response to detection of a slip on the left front wheel 62a, the brake torque is output to the left front wheel 62a by the hydraulic brake 54a. The routine accordingly sets the left front wheel speed Vfl to a brake wheel speed Vbr (step S324). When the left wheel slip occurrence flag F3 is equal to 0 and the right wheel slip occurrence flag F4 is equal to 1, that is, in response to detection of a slip on the right front wheel 62b, on the other hand, the brake torque is output to the right front wheel 62b by the hydraulic brake 54b. The routine accordingly sets the right front wheel speed Vfr to the brake wheel speed Vbr (step S326). The routine then does not continue for the preset time period, the routine sets the value '1' to the hydraulic brake control permission flag Fc (step S336), before being terminated. The procedure of the embodiment detects the lock of the wheel, based on the difference between the brake wheel speed Vbr and the vehicle body speed V. Another technique may be adopted for the same purpose; for example, the detection may be based on the result of determination of whether a time-differential of the brake wheel speed Vbr is less than a preset level.

Figure 13:
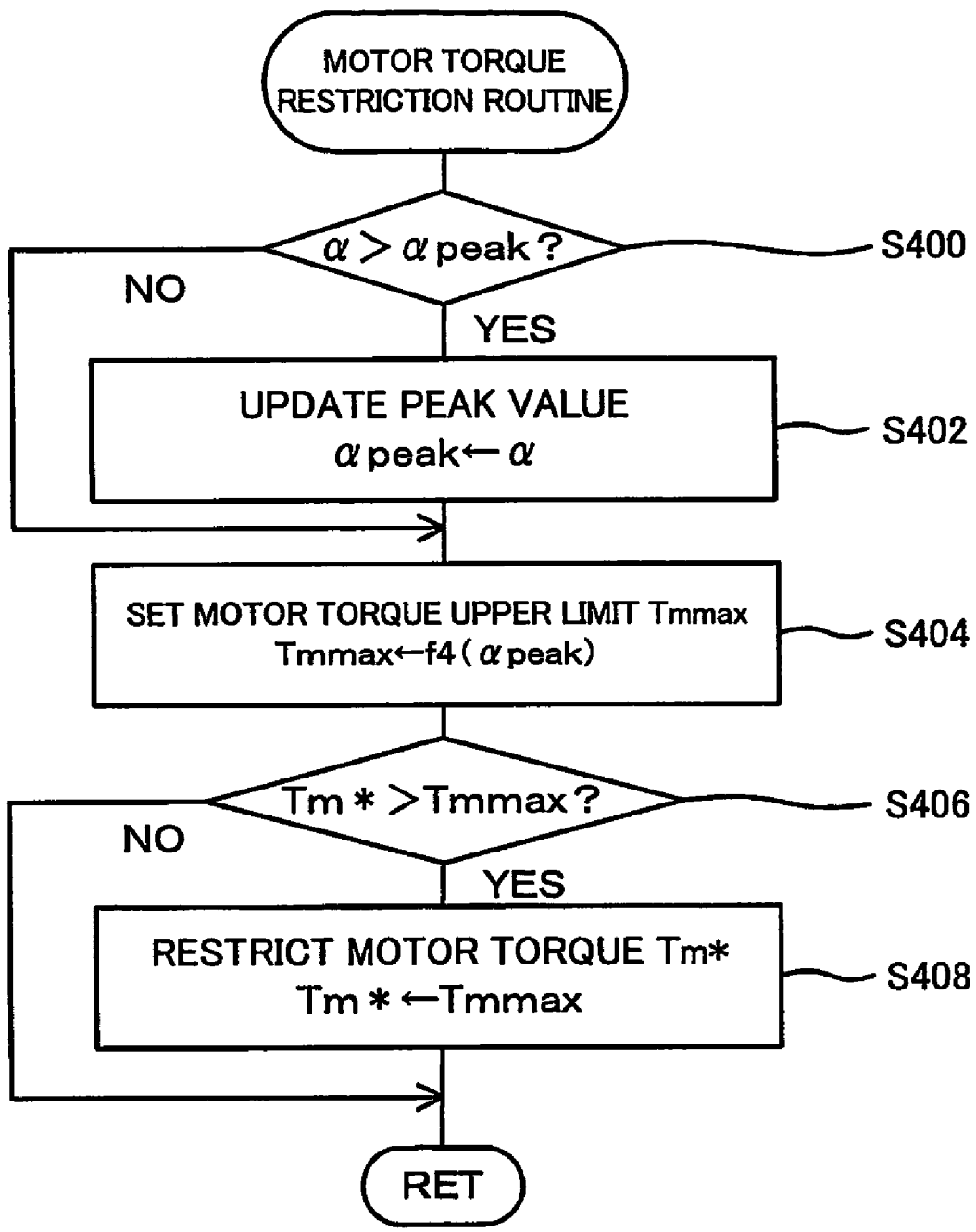
FIG. 13 is a flowchart showing a motor torque restriction routine executed by the main electronic control unit 70 in the vehicle 20 of the embodiment.
Figure 14:
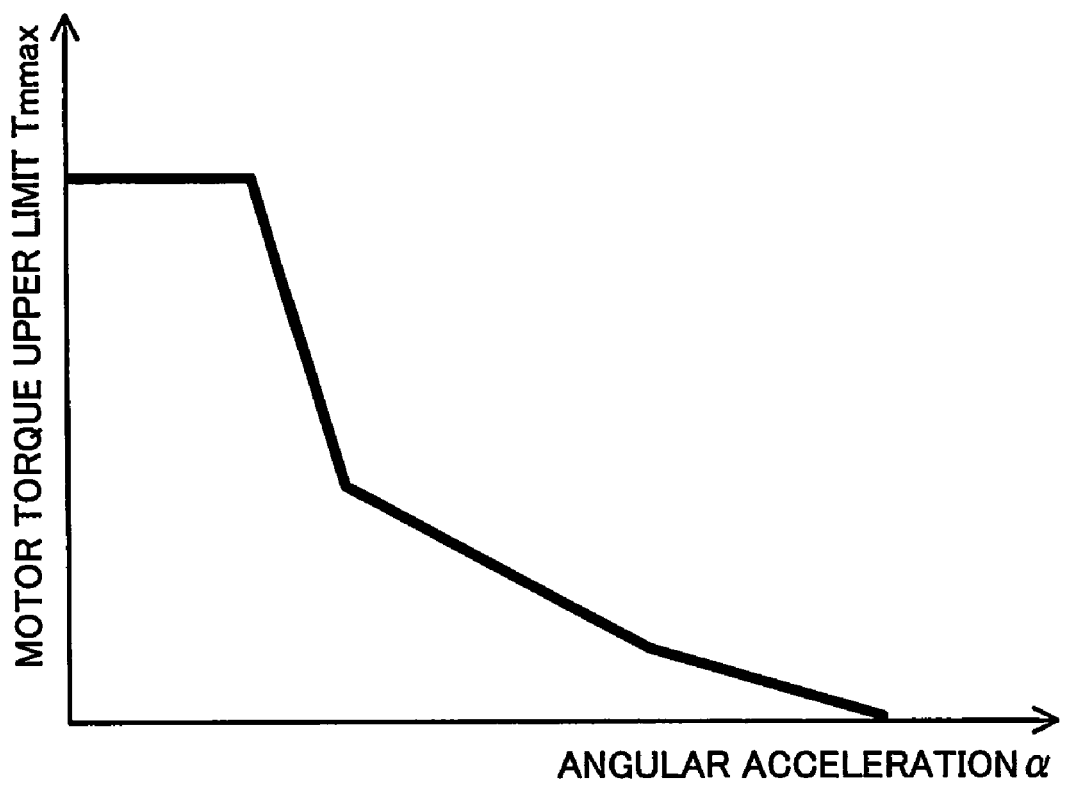
FIG. 14 is a map showing a variation in motor torque upper limit Tmmax against the peak value αpeak of angular acceleration.

The motor torque restriction process at step S110 in the drive control routine of FIG. 2 is carried out according to a motor torque restriction routine of FIG. 13. The motor torque restriction routine first determines whether the current value of the angular acceleration α exceeds a peak value αpeak (step S400). When it is determined that the current value of the angular acceleration α exceeds the peak value αpeak, the routine updates the peak value αpeak to the current value of the angular acceleration α (step S402). The peak value αpeak represents a peak of the angular acceleration α, which rises due to a slip, and is set equal to 0 as an initial value. Until the angular acceleration α rises and reaches its peak, the peak value αpeak is successively updated to the latest value of the angular acceleration α. When the angular acceleration α reaches its peak, the peak value αpeak is fixed to the value of the angular acceleration α at the moment. The routine subsequently sets a motor torque upper limit Tmmax, which represents an allowable upper limit of torque output from the motor 22, based on the setting of the peak value αpeak (step S404). The procedure of the embodiment uses a torque upper limit setting map of FIG. 14 showing a variation in motor torque upper limit Tmmax against the angular acceleration α. In the map of this illustrated example, the motor torque upper limit Tmmax decreases with an increase in angular acceleration α. A smaller value is set to the motor torque upper limit Tmmax, as the angular acceleration α rises to increase the peak value αpeak and enhance the degree of a slip. Such setting restricts the output torque from the motor 12. After setting the motor torque upper limit Tmmax, the routine restricts the motor torque Tm* set at step S102 in the drive control routine of FIG. 2 with the motor torque upper limit Tmmax (steps S406 and S408), before being terminated. This series of processing restricts the output torque from the motor 22 in the event of the occurrence of a slip to a low torque level for eliminating the slip (that is, the motor torque upper limit Tmmax corresponding to the peak value αpeak of the angular acceleration in the map of FIG. 14). This arrangement effectively eliminates the slip.

Figure 15:
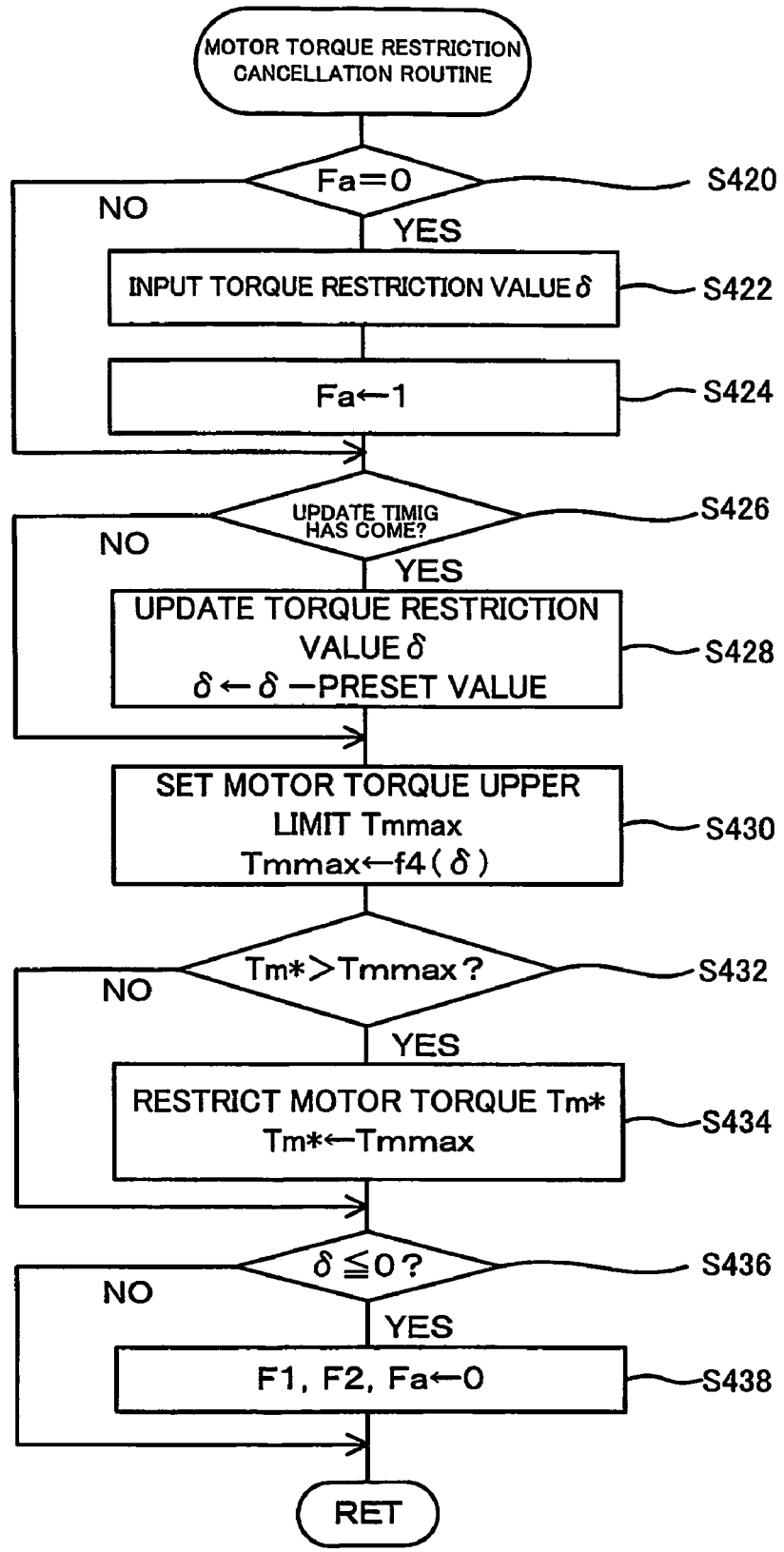
FIG. 15 is a flowchart showing a motor torque restriction cancellation routine executed by the main electronic control unit 70 in the vehicle 20 of the embodiment.
Figure 16:
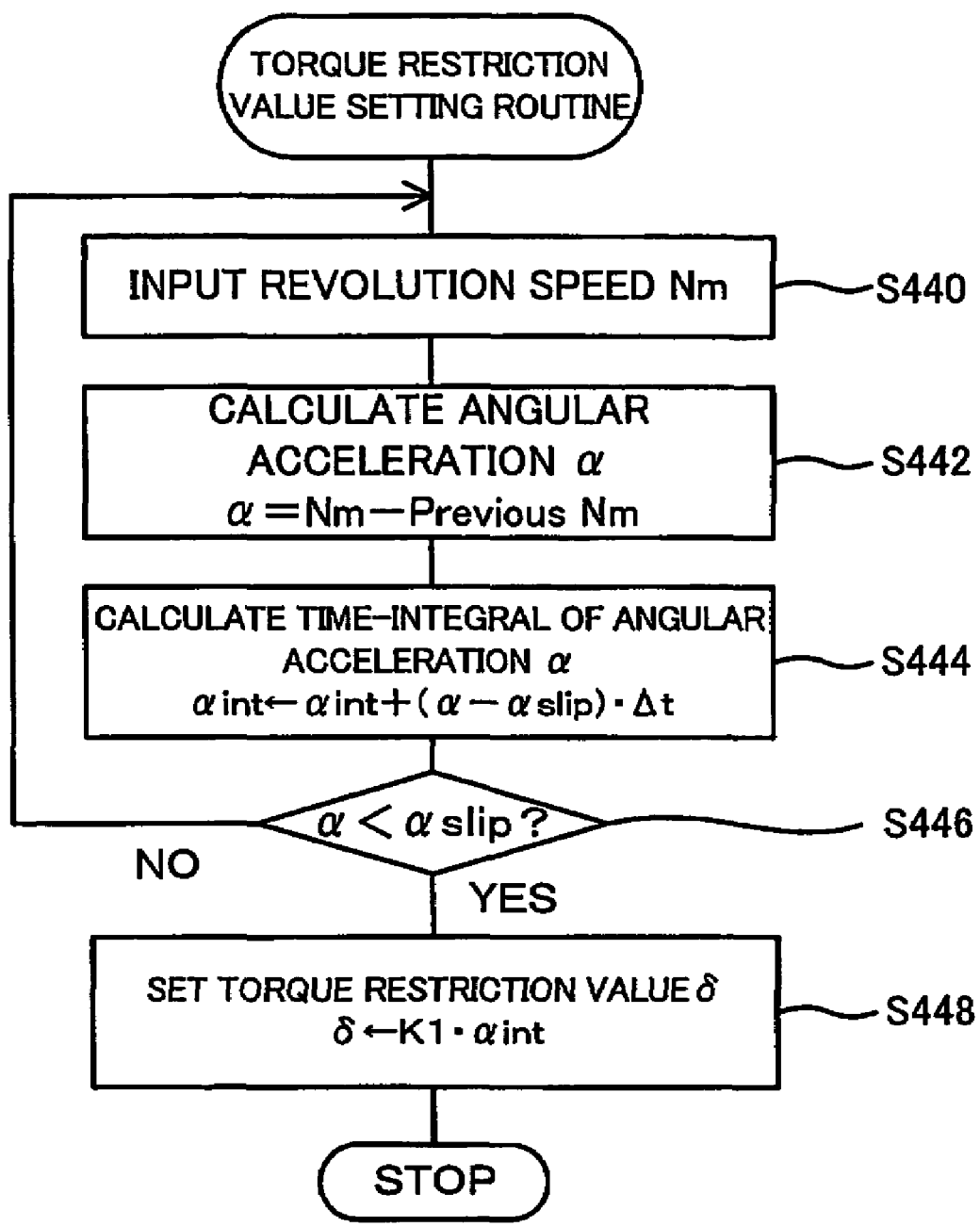
FIG. 16 is a torque restriction value setting routine executed by the main electronic control unit 70 in the vehicle 20 of the embodiment.

The motor torque restriction cancellation process at step S112 in the drive control routine of FIG. 2 is carried out according to a motor torque restriction cancellation routine of FIG. 15. The motor torque restriction cancellation routine first determines whether a motor torque restriction cancellation flag Fa is equal to 0 (step S420). When the motor torque restriction cancellation flag Fa is equal to 0, the routine inputs a torque restriction value δ (in the same unit 'rpm/8 msec' as that of the angular acceleration) (step S422) while setting the value '1' to the motor torque restriction cancellation flag Fa (step S424). Here the torque restriction value δ is a parameter used to raise the motor torque upper limit Tmmax set corresponding to the peak value αpeak of the angular acceleration in the map of FIG. 14 and thereby to set a degree of cancellation of the torque restriction according to the motor torque restriction process of FIG. 13. The torque restriction value δ is set according to a torque restriction value setting routine of FIG. 16. The torque restriction value setting routine is executed in response to setting of the value '1' to the slip occurrence flag F1 at step S132 in the slip state detection routine of FIG. 4 (that is, when the angular acceleration α exceeds the threshold value αslip). The torque restriction value setting routine first inputs the current revolution speed Nm of the drive shaft 28 (step S440) and subtracts the previous revolution speed Nm input at step S440 in the previous cycle of this routine from the input current revolution speed Nm to calculate the angular acceleration α (step S442). The routine then calculates a time-integral αint of the angular acceleration α from a time point when the calculated angular acceleration α exceeds the threshold value αslip to a time point when the angular acceleration α becomes less than the threshold value αslip again according to Equation (3) given below (step S444). In Equation (3), 'Δt' denotes a time interval of repeated execution of steps S440 through S446 in this routine.

$$\alpha int \leftarrow \alpha int + (\alpha - \alpha slip) \cdot \Delta t \quad (3)$$

On conclusion of integration when the angular acceleration α becomes less than the threshold value αslip again(step S446), the routine sets the product of the calculated time-integral αint and a preset coefficient K1 to the torque restriction value δ (step S448) and is then terminated. The procedure of this embodiment calculates the torque restriction value δ with the preset coefficient K1. Another applicable procedure prepares a map showing a variation in motor torque upper limit Tmmax against the time integral αint and reads and sets the motor torque Tmmax corresponding to the calculated time-integral αint from the map.

Referring back to the flowchart of FIG. 15, after the input of the torque restriction value δ, the motor torque restriction cancellation routine determines whether an update timing of the torque restriction value δ has come (step S426). When it is determined that the update timing has come, the routine subtracts a preset value from the torque restriction value δ to update and newly set the torque restriction value δ (step S428). This updating process increases the motor torque upper limit Tmmax, which is set by the motor torque restriction routine of FIG. 13, stepwise with elapse of time to cancel the torque restriction. When it is determined that the update timing has not yet come, on the other hand, update of the torque restriction value δ is not implemented. The routine then sets the motor torque upper limit Tmmax as the allowable upper limit of torque output from the motor 22, based on the torque restriction value δ according to the map of FIG. 14 (step S430). The routine then restricts the motor torque Tm* set at step S102 in the drive control routine of FIG. 2 with the setting of the motor torque upper limit Tmmax (steps S432 and S434), and determines whether the torque restriction value δ becomes not greater than 0 (step S436). When the torque restriction value δ becomes not greater than 0, the routine resets the slip occurrence flag F1, the slip convergence flag F2, and the motor torque restriction cancellation flag Fa to 0 (step S438) and is then terminated. In this manner, the procedure of this embodiment regulates the output torque from the motor 22, based on the torque restriction value δ calculated from the time-integral αint of the angular acceleration α. Such torque control cancels the torque restriction by an adequate degree corresponding to the state of a slip, in response to convergence of the slip, and thereby effectively prevents the re-occurrence of a slip without excess torque restriction.

Figure 17:
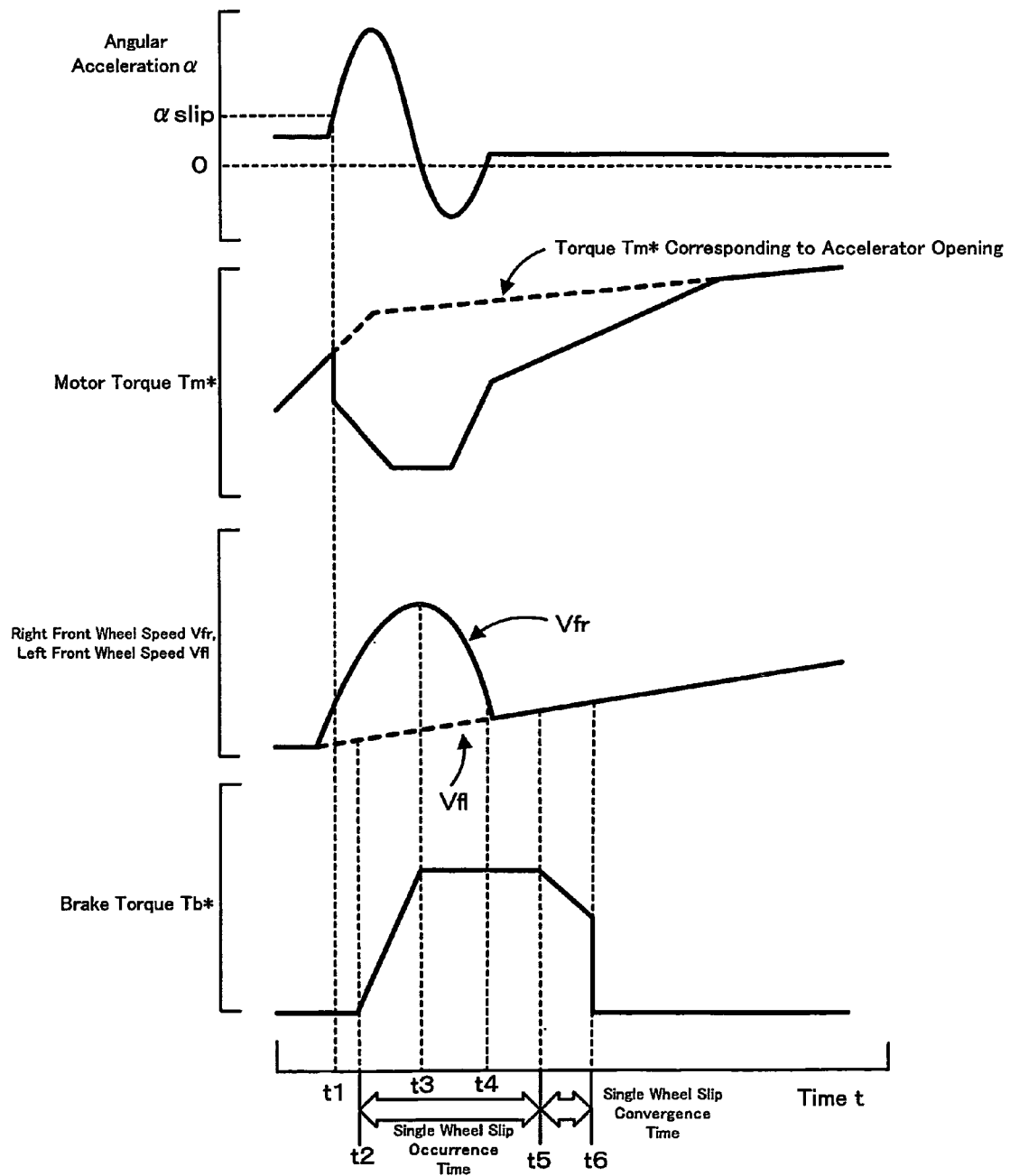
FIG. 17 shows time variations in angular acceleration a, motor torque Tm*, right front wheel speed Vfr, left front wheel speed Vfl, and brake torque Tb* in the event of the occurrence of a slip on a right front wheel.

FIG. 17 shows time variations in angular acceleration α, motor torque Tm*, right front wheel speed Vfr, left front wheel speed Vfl, and brake torque Tb* in the event of spin of one of the left and right front wheels 62a and 62b. In the illustrated example of FIG. 17, a single wheel slip occurs due to spin of the right front wheel speed Vfr. In response to detection of the occurrence of a slip on the drive shaft 28 at a time point t1 when the angular acceleration α of the drive shaft 28 exceeds the threshold value αslip, the output torque from the motor 22 to the drive shaft 28 is restricted. In the case where the slip of the drive shaft 28 is caused by the spin of the right front wheel speed Vfr (single wheel), after continuance of the single wheelspin from the time point t1 to a time point t2, the brake torque Tb* output to the spinning single wheel is gradually heightened with elapse of time. The brake torque Tb* output to the right front wheel speed Vfr is fixed at a time point t3 when the spin of the right front wheel speed Vfr reaches its peak. In the case of an insufficiency of the motor torque Tm* relative to the balancing torque Tgrad, the brake torque Tb* is set to supplement the torque insufficiency. In response to continuance of the non-spin state from a time point t4 when the spin of the right front wheel speed Vfr stops to a time point t5 as a first preset time, the control procedure lowers the brake torque Tb* output to the right front wheel speed Vfr. In response to further continuance of the non-spin state to a time point t6 as a second preset time, the control procedure sets the value '0' to the brake torque Tb* output to the right front wheel speed Vfr to completely terminate output of the brake torque. In the event of the occurrence of a slip on one of the left and right front wheels 62a and 62b, the control procedure outputs the brake torque Tb* to the slip wheel, while restricting the motor torque Tm*. Such control enables the output torque from the motor 22 to the drive shaft 28 to be distributed practically equally into the left and right front wheels 62a and 62b. This desirably improves the starting performance and the accelerating performance of the vehicle 20 with the left and right front wheels 62a and 62b running on the road surface of different frictional coefficients.

As described above, when the spin of one of the left and right front wheels 62a and 62b (single wheel) causes a slip on the left and right front wheels 62a and 62b, the vehicle 20 of the embodiment restricts the output torque of the motor 22 to the drive shaft 28 linked with the left and right front wheels 62a and 62b and activates the hydraulic brake 54a or 54b corresponding to the spinning wheel to output the brake torque. The vehicle 20 of the embodiment thus enables the output torque of the motor 22 to be practically equally distributed into the left and right front wheels 62a and 62b, while eliminating the slip. This arrangement ensures the driving stability of the vehicle in the event of a single wheel slip. When the slip wheel speed VSLIP has passed its peak and the single wheel slip is coming to convergence, a torque insufficiency of the motor torque Tm* relative to the balancing torque Tgrad equivalent to the road surface gradient θgr is supplemented by the brake torque Tb* generated by the hydraulic brake 54a or 54b corresponding to the spinning wheel. Such control enables the torque of the motor 22 (motor torque Tm*) to be output to the non-spinning wheel as the torque required for a start or acceleration of the vehicle according to the road surface gradient θgr. This improves the starting performance and the accelerating performance of the vehicle, regardless of the road surface gradient θgr.

When there is a possibility of overheat of the hydraulic brake 54a or 54b, the vehicle 20 of the embodiment stops the output of brake torque by the hydraulic brake 54a or 54b for a preset time period. This arrangement desirably protects the hydraulic brakes 54a and 54b from overheating.

In the event of a lock of the wheel due to output of the brake torque by the hydraulic brake 54a or 54b corresponding to the spinning wheel out of the left and right front wheels 62a and 62b, the vehicle 20 of the embodiment stops the output of brake torque by the hydraulic brake 54a or 54b. This arrangement desirably prevents the vehicle 20 from falling into an unstable attitude by the lock of the wheel.

In the vehicle 20 of the embodiment, the brake torque upper limit Tbmax, as the allowable upper limit of brake torque output by the hydraulic brake 54a or 54b in response to spin of one of the left and right front wheels 62a and 62b, is set based on the vehicle body speed V and the balancing torque Tgrad equivalent to the road surface gradient θgr. The brake torque upper limit Tbmax may be set based on only the vehicle body speed V, or may be set to a fixed value irrespective of the variation in vehicle body speed V or the variation in balancing torque Tgrad. The brake torque upper limit Tbmax may not be set at all, if not required.

When the vehicle body speed V exceeds the threshold value specified corresponding to the road surface gradient θgr (the balancing torque Tgrad) in the course of output of the brake torque by the hydraulic brake 54a or 54b in response to spin of one of the left and right front wheels 62a and 62b, the vehicle 20 of the embodiment sets the value '0' to the brake torque Tb* to terminate output of the brake torque. Output of the brake torque may be terminated when the vehicle body speed V exceeds a fixed threshold value, which does not vary depending upon the road surface gradient θgr. Output of the brake torque may not be terminated, irrespective of the variation in vehicle body speed V.

In the vehicle 20 of the embodiment, when the slip wheel speed VSLIP has passed a peak, a torque insufficiency of the motor torque Tm* relative to the balancing torque Tgrad is supplemented by the brake torque Tb* of the hydraulic brake 54a or 54b. One possible modification may cause the torque insufficiency of the motor torque Tm* relative to the balancing torque Tgrad to be supplemented by the brake torque Tb* of the hydraulic brake 54a or 54b, in response to detection of convergence of a single wheel slip.

When the output torque of the motor 22 to the drive shaft 28 has an insufficiency relative to the balancing torque Tgrad, the vehicle 20 of the embodiment sets the brake torque Tb* generated by the hydraulic brake 54a or 54b to supplement the torque insufficiency. Setting of the supplementary brake torque based on the balancing torque Tgrad may be omitted, if not required.

The vehicle 20 of the embodiment determines the possibility of overheat of the hydraulic brake 54a or 54b, based on the output time of brake torque by the hydraulic brake 54a or 54b in response to the spin of one of the left and right front wheels 62a and 62b. The observed temperature of the hydraulic brake 54a or 54b may be used to determine the possibility of overheat of the hydraulic brake 54a or 54b.

The vehicle 20 of the embodiment determines whether there is a possibility of overheat of the hydraulic brake 54a or 54b. When there is a potential for overheat, the output of the brake torque by the hydraulic brake 54a or 54b is prohibited at step S114 in the drive control routine of FIG. 2. The hydraulic brakes 54a and 54b of specific performances may not require such determination of the possibility of overheat of the hydraulic brakes 54a and 54b. In this case, execution of the hydraulic brake cool-down routine of FIG. 11 is omitted.

The vehicle 20 of the embodiment determines the occurrence or non-occurrence of a slip due to the spin of the left and right front wheels 62a and 62b, based on the angular acceleration α of the drive shaft 28. The occurrence or non-occurrence of a slip due to the spin of the left and right front wheels 62a and 62b may otherwise be determined, based on a difference between the speed of the left and right front wheels 62a and 62b as drive wheels and the speed of the left and right rear wheels 64a and 64b as driven wheels.

The vehicle 20 of the embodiment activates the hydraulic brakes 54a and 54b, which work with hydraulic pressure, to respectively output the brake torques to the left and right front wheels 62a and 62b. The hydraulic brakes 54a and 54b may be replaced by any other mechanical brakes that are capable of mechanically braking the left and right front wheels 62a and 62b by means of the friction.

Figure 18:
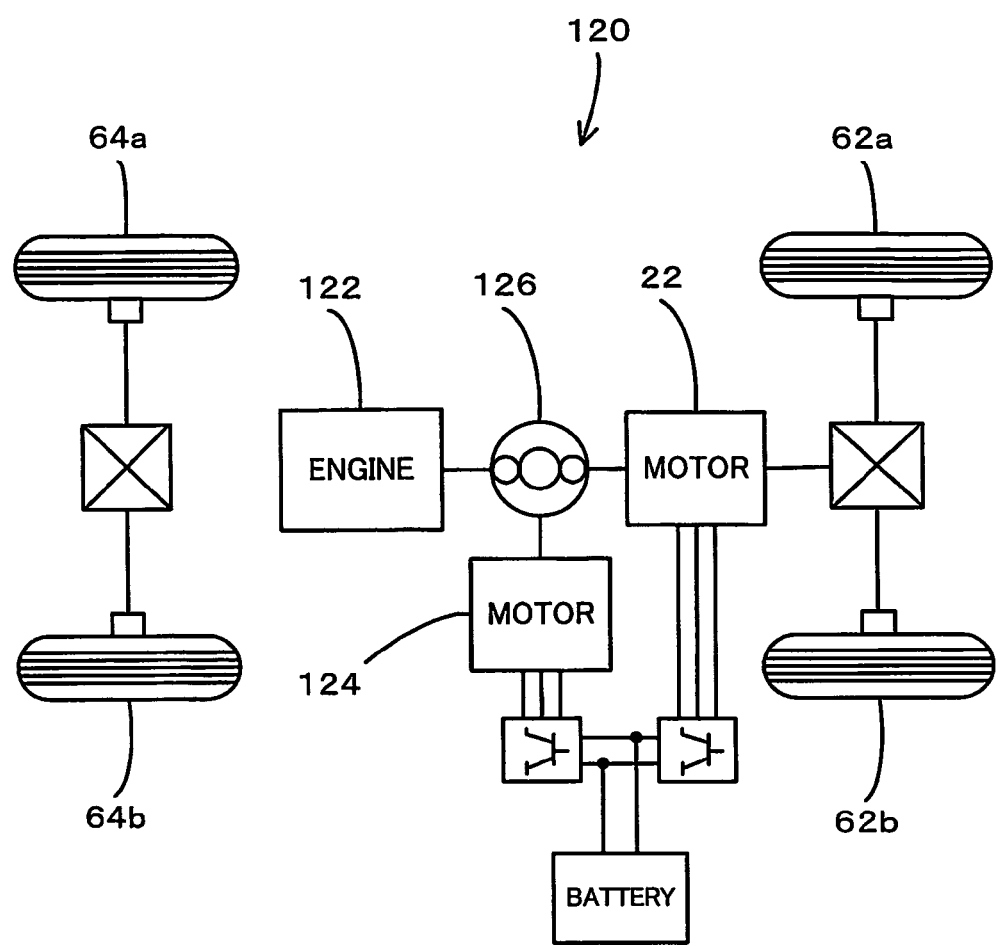
FIG. 18 schematically illustrates the configuration of a vehicle 120 in one modified example.
Figure 19:
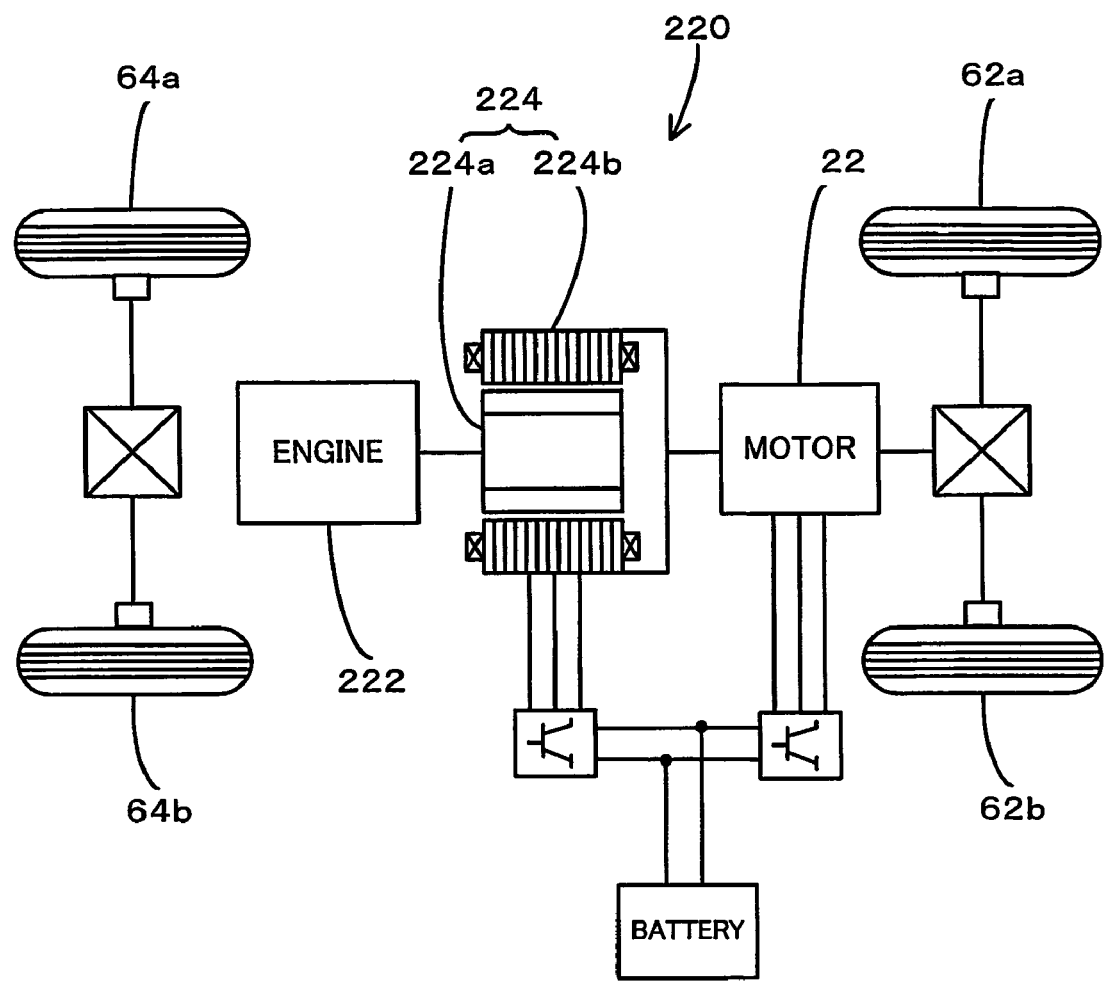
FIG. 19 schematically illustrates the configuration of a vehicle 220 in another modified example.
Figure 20:
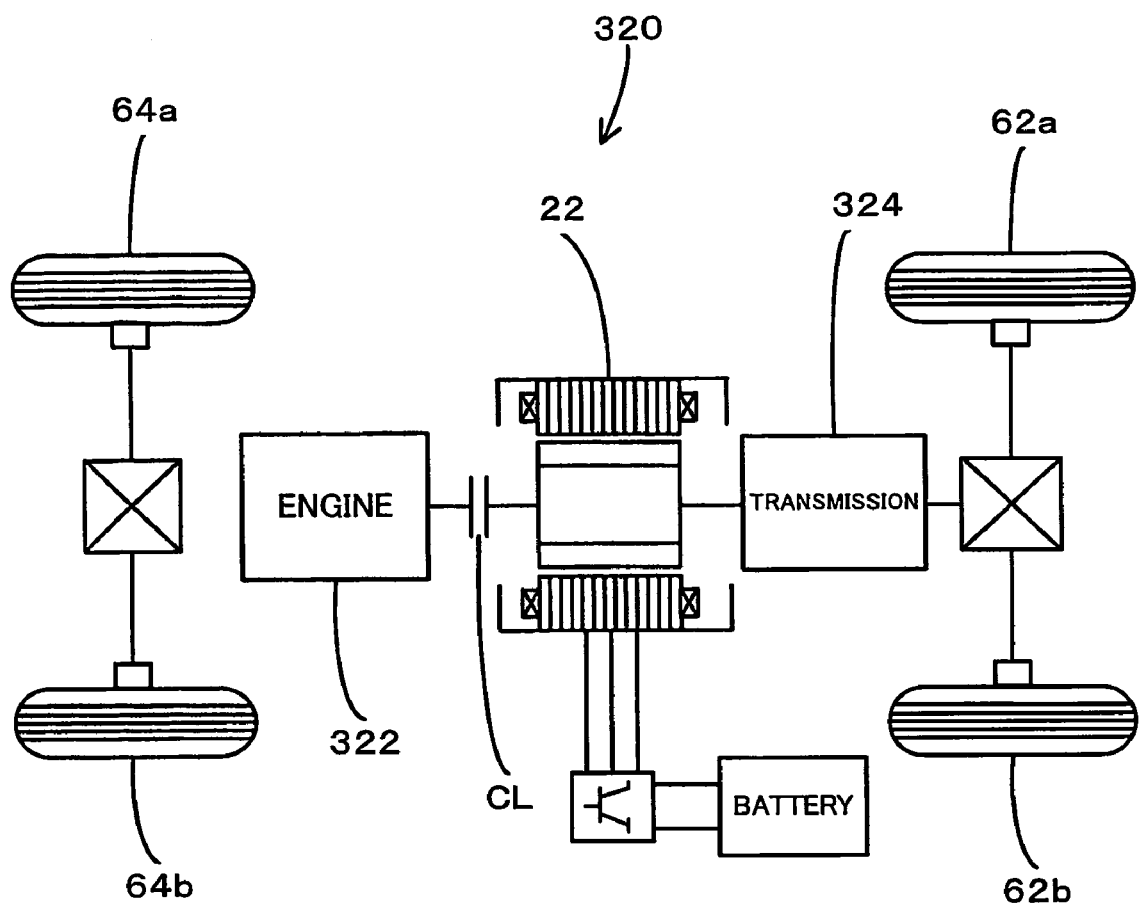
FIG. 20 schematically illustrates the configuration of a vehicle 320 in still another modified example.

The embodiment discussed above regards the vehicle 20 equipped with the motor 22 that is mechanically connected to the drive shaft to directly output power to the drive shaft linked with the left and right front wheels 62a and 62b. The technique of the invention may be applied to any vehicle equipped with a power output device that is capable of outputting power to a drive shaft. For example, the technique of the invention is applicable to a series hybrid vehicle including an engine, a generator that is linked with an output shaft of the engine, and a motor that utilizes a supply of electric power generated by the generator to output power to a drive shaft. The technique of the invention is also applicable to a mechanical distribution-type hybrid vehicle 120 of FIG. 18 including an engine 122, a planetary gear unit 126 that is linked with the engine 122, a motor 124 that is connected with the planetary gear unit 126 and generates electric power, and a motor 22 that is connected with the planetary gear unit 126 and is mechanically linked with a drive shaft connecting with left and right front wheels 62a and 62b to output power to the drive shaft. The technique is further applicable to an electrical distribution-type hybrid vehicle 220 of FIG. 19 including an engine 222, a motor 224 that has an inner rotor 224*a* linked with an output shaft of the engine 222 and an outer rotor 224*b* attached to a drive shaft connecting with left and right front wheels 62*a* and 62*b* and relatively rotates through electromagnetic functions of the inner rotor 224*a* to the outer rotor 224*b*, and a motor 22 that is mechanically linked with the drive shaft to output power to the drive shaft. The technique is also applicable to a hybrid vehicle 320 of FIG. 20 including a motor 22 that is linked via a transmission 324 (for example, a continuously variable transmission or an automatic step transmission) with a drive shaft connecting with left and right front wheels 62*a* and 62*b*, and an engine 322 that is linked with a rotating shaft of the motor 22 via a clutch CL. In the event of the occurrence of a slip on the drive wheels, the control procedure mainly controls the motor mechanically linked with the drive shaft by taking into account its quick output response and thereby restricts the torque output to the drive shaft. Control of another motor and control of the engine may be carried out in cooperation with the control of this motor.

The embodiment discussed above is to be considered in all aspects as illustrative and not restrictive. There may be many modifications, changes, and alterations without departing from the scope or spirit of the main characteristics of the present invention.

INDUSTRIAL APPLICABILITY

The technique of the invention is applicable to industries relating to vehicles like automobiles and train cars.

The invention claimed is:

1. A vehicle equipped with a power output device including an electric motor that is capable of outputting a driving force to a drive shaft linked with left and right wheels, said vehicle comprising:
   a mechanical braking device that is capable of outputting a mechanical braking force to each of the left and right wheels;
   a slip detection module that detects a slip on each of the left and right wheels caused by wheelspin; and
   a controller that, in response to detection of a slip caused by spin of one of the left and right wheels by said slip detection module, drives and controls said power output device to restrict the driving force output to the drive shaft, and after the driving force output to the drive shaft has been restricted, actuates and controls said mechanical braking device to output a mechanical braking force to the spinning one of the left and right wheels, subject to fulfillment of a predetermined execution condition,
   wherein the predetermined execution condition includes at least one of a gearshift position in a forward drivable range, an accelerator-on state, a driving force demand of not less than a preset level required to the drive shaft, and a brake-off state.

2. A vehicle in accordance with claim 1, wherein said controller actuates and controls said mechanical braking device to output a braking force to the spinning one of the left and right wheels, so as to distribute the driving force output from said power output device to the drive shaft practically equally into the left and right wheels.

3. A vehicle in accordance with claim 1, said vehicle further comprising:
   a road surface gradient measurement estimation module that either measures or estimates a road surface gradient,
   wherein said controller actuates and controls said mechanical braking device, in response to detection of at least a converging tendency with regard to the spin of one of the left and right wheels, to output the braking force to the spinning one of the left and right wheels, based on the measured or estimated road surface gradient.

4. A vehicle in accordance with claim 3, wherein said road surface gradient measurement estimation module estimates a balancing force, which balances with a force applied to said vehicle in a direction along a road surface based on an acceleration of said vehicle and the driving force output from said power output device, as the road surface gradient, and
   said controller calculates a supplementary braking force corresponding to an insufficiency of the driving force output from said power output device to the drive shaft relative to the estimated balancing force, and actuates and controls said mechanical braking device to output a total braking force including the calculated supplementary braking force to the spinning one of the left and right wheels.

5. A vehicle in accordance with claim 1, said vehicle further comprising:
   an upper limit braking force setting module that sets an upper limit of the braking force output to the spinning one of the left and right wheels,
   wherein said controller actuates and controls said mechanical braking device to output the braking force in a range of the setting of the upper limit to the spinning one of the left and right wheels.

6. A vehicle in accordance with claim 5, said vehicle further comprising:
   a vehicle speed sensor that measures a vehicle speed,
   wherein said upper limit braking force setting module sets the upper limit of the braking force, based on the measured vehicle speed.

7. A vehicle in accordance with claim 5, said vehicle further comprising:
   a road surface gradient measurement estimation module that either measures or estimates a road surface gradient,
   wherein said upper limit braking force setting module sets the upper limit of the braking force, based on the measured or estimated road surface gradient.

8. A vehicle in accordance with claim 1, wherein said controller terminates the output of the braking force to the spinning one of the left and right wheels, when the predetermined execution condition fails to be fulfilled in the course of the output of the braking force to the spinning one of the left and right wheels.

9. A vehicle in accordance with claim 1, said vehicle further comprising:
   a vehicle speed sensor that measures a vehicle speed,
   wherein said controller terminates the output of the braking force to the spinning one of the left and right wheels, when the measured vehicle speed exceeds a threshold value in the course of the output of the braking force to the spinning one of the left and right wheels.

10. A vehicle in accordance with claim 9, said vehicle further comprising:
    a road surface gradient measurement estimation module that either measures or estimates a road surface gradient,
    wherein the threshold value is set according to the measured or estimated road surface gradient.

11. A vehicle in accordance with claim 10, wherein the threshold value is set to decrease with an increase in road surface gradient as an ascending slope.

12. A vehicle in accordance with claim 1, wherein said controller terminates the output of the braking force to the spinning one of the left and right wheels, in response to detection of a slip caused by spin of the other wheel of the left and right wheels by said slip detection module in the course of the output of the braking force to the spinning one of the left and right wheels.

13. A vehicle in accordance with claim 1, said vehicle further comprising:
   a temperature rise detection estimation module that either detects or estimates a predetermined temperature rise in said mechanical braking device,
   wherein said controller terminates the output of the braking force to the spinning one of the left and right wheels, in response to either detection or estimation of the predetermined temperature rise in said mechanical braking device in the course of the output of the braking force to the spinning one of the left and right wheels.

14. A vehicle in accordance with claim 13, wherein said temperature rise detection estimation module estimates the predetermined temperature rise in said mechanical braking device, when the output of the braking force to the spinning one of the left and right wheels continues for a predetermined first time.

15. A vehicle in accordance with claim 13, wherein said controller prohibits output of a braking force in response to spin of one of the left and right wheels over a predetermined second time, after the termination of the output of the braking force.

16. A vehicle in accordance with claim 1, said vehicle further comprising:
   a lock detection module that detects a lock of each of the left and right wheels,
   wherein said controller terminates the output of the braking force to the spinning one of the left and right wheels, in response to detection of a lock of the spinning one of the left and right wheels by said lock detection module in the course of the output of the braking force to the spinning one of the left and right wheels.

17. A vehicle in accordance with claim 1, said vehicle further comprising:
   a revolution speed measurement sensor that respectively measures revolution speeds of the left and right wheels; and
   a rudder angle measurement estimation module that either measures or estimates a rudder angle,
   wherein said slip detection module detects a slip on each of the left and right wheels, based on the measured revolution speeds of the left and right wheels and the measured or estimated rudder angle.

18. A vehicle in accordance with claim 1, wherein said slip detection module detects a slip caused by spin of a drive wheel, based on at least one of an angular acceleration of the drive shaft and a difference between revolution speeds of drive wheels as the left and right wheels linked with the drive shaft and revolution speeds of driven wheels with no output of driving force, and
   said controller drives and controls said power output device to restrict the driving force output to the drive shaft, in response to detection of a slip caused by the spin of the drive wheel.

19. A vehicle equipped with a power output device including an electric motor that is capable of outputting a driving force to a drive shaft linked with left and right wheels, said vehicle comprising:
   a mechanical braking device that is capable of outputting a mechanical braking force to each of the left and right wheels;
   a slip detection module that detects a slip on each of the left and right wheels caused by wheelspin;
   a controller that, in response to detection of a slip caused by spin of one of the left and right wheels by said slip detection module, drives and controls said power output device to restrict the driving force output to the drive shaft, and after the driving force output to the drive shaft has been restricted, actuates and controls said mechanical braking device to output a mechanical braking force to the spinning one of the left and right wheels; and
   a temperature rise detection estimation module that either detects or estimates a predetermined temperature rise in said mechanical braking device,
   wherein said controller terminates the output of the braking force to the spinning one of the left and right wheels, in response to either detection or estimation of the predetermined temperature rise in said mechanical braking device in the course of the output of the braking force to the spinning one of the left and right wheels.

20. A vehicle equipped with a power output device including an electric motor that is capable of outputting a driving force to a drive shaft linked with left and right wheels, said vehicle comprising:
   a mechanical braking device that is capable of outputting a mechanical braking force to each of the left and right wheels;
   a slip detection module that detects a slip on each of the left and right wheels caused by wheelspin;
   a controller that, in response to detection of a slip caused by spin of one of the left and right wheels by said slip detection module, drives and controls said power output device to restrict the driving force output to the drive shaft, and after the driving force output to the drive shaft has been restricted, actuates and controls said mechanical braking device to output a mechanical braking force to the spinning one of the left and right wheels; and
   a temperature rise detection estimation module that either detects or estimates a predetermined temperature rise in said mechanical braking device,
   wherein said controller terminates the output of the braking force to the spinning one of the left and right wheels, in response to either detection or estimation of the predetermined temperature rise in said mechanical braking device in the course of the output of the braking force to the spinning one of the left and right wheels, and
   wherein said temperature rise detection estimation module estimates the predetermined temperature rise in said mechanical braking device, when the output of the braking force to the spinning one of the left and right wheels continues for a predetermined first time.

* * * * *